United States Patent
Mildh et al.

(10) Patent No.: US 10,454,686 B2
(45) Date of Patent: Oct. 22, 2019

(54) METHOD, APPARATUS, AND SYSTEM FOR PROVIDING ENCRYPTION OR INTEGRITY PROTECTION IN A WIRELESS NETWORK

(71) Applicant: Telefonaktiebolaget LM Ericsson (publ), Stockholm (SE)

(72) Inventors: Gunnar Mildh, Sollentuna (SE); Henrik Basilier, Täby (SE); Torbjörn Cagenius, Sollentuna (SE); Gunnar Nilsson, Lidingö (SE); Stefan Rommer, Västra Frölunda (SE); Lennart Norell, Hägersten (SE); Göran Rune, Linköping (SE); Ann-Christine Sander, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/562,697

(22) PCT Filed: Apr. 8, 2016

(86) PCT No.: PCT/EP2016/057797
§ 371 (c)(1),
(2) Date: Sep. 28, 2017

(87) PCT Pub. No.: WO2016/162502
PCT Pub. Date: Oct. 13, 2016

(65) Prior Publication Data
US 2018/0062847 A1 Mar. 1, 2018

Related U.S. Application Data

(60) Provisional application No. 62/144,659, filed on Apr. 8, 2015.

(51) Int. Cl.
*H04L 29/06* (2006.01)
*H04L 9/32* (2006.01)
(Continued)

(52) U.S. Cl.
CPC .......... *H04L 9/3239* (2013.01); *H04L 9/0643* (2013.01); *H04L 9/0838* (2013.01);
(Continued)

(58) Field of Classification Search
CPC ...................................................... H04L 9/3239
See application file for complete search history.

(56) References Cited

U.S. PATENT DOCUMENTS 8,713,320 B2    4/2014   Xu et al.
2003/0044011 A1*  3/2003   Vialen ............... H04W 12/0013
                                                          380/201
(Continued)

FOREIGN PATENT DOCUMENTS

WO      2007043846 A1    4/2007

OTHER PUBLICATIONS

Author Unknown, "Technical Specification Group Services and System Aspects; General Packet Radio Service (GPRS) enhancements for Evolved Universal Terrestrial Radio Access Network (E-UTRAN) access (Release 13)," Technical Specification 23.401, Version 13.2.0, 3GPP Organizational Partners, Mar. 2015, 313 pages.

(Continued)

*Primary Examiner* — Shawnchoy Rahman
(74) *Attorney, Agent, or Firm* — Withrow & Terranova, PLLC

(57) ABSTRACT

A core network node identifies a non-USIM based authentication procedure to be utilized by a wireless communication device, WCD, being served by the core network node. The node obtains a session key associated with the identified non-USIM based authentication procedure. The node converts the session key associated with the identified non-USIM based authentication procedure to i) a first key, $K_1$, for use by the WCD and a base station serving the WCD to derive an encryption or integrity protection key, $K_{enc/int}$, for enabling encryption or integrity protection of a communication between the WCD and the base station or ii) a second key, $K_2$, for use by the WCD and the core network node to derive the first key $K_1$. The node then send i) $K_1$ to the base station or ii) $K_2$ to another core network node that is configured to derive $K_1$ from $K_2$.

55 Claims, 28 Drawing Sheets

(51) Int. Cl.
　　　*H04W 12/02* (2009.01)
　　　*H04W 12/10* (2009.01)
　　　*H04L 9/06* (2006.01)
　　　*H04L 9/08* (2006.01)
　　　*H04L 9/14* (2006.01)
　　　*H04W 8/08* (2009.01)
　　　*H04W 88/02* (2009.01)

(52) U.S. Cl.
　　　CPC .............. *H04L 9/0861* (2013.01); *H04L 9/14* (2013.01); *H04L 63/123* (2013.01); *H04W 8/08* (2013.01); *H04W 12/02* (2013.01); *H04W 12/10* (2013.01); *H04L 2209/80* (2013.01); *H04W 88/02* (2013.01)

(56) References Cited

U.S. PATENT DOCUMENTS

| | | | | |
|---|---|---|---|---|
| 2008/0273704 | A1* | 11/2008 | Norrman | H04L 63/062 380/278 |
| 2008/0317247 | A1* | 12/2008 | Jeong | H04W 12/06 380/44 |
| 2010/0054472 | A1* | 3/2010 | Barany | H04L 63/0428 380/270 |
| 2013/0067552 | A1* | 3/2013 | Hawkes | H04L 63/166 726/7 |

OTHER PUBLICATIONS

Author Unknown, "Digital cellular telecommunications system (Phase 2+); Universal Mobile Telecommunications System (UMTS); LTE; 3GPP System Architecture Evolution (SAE); Security architecture," Technical Specification 33.401, Version 12.12.0, Release 12, European Telecommunications Standards Institute, Oct. 2014, 131 pages.

Author Unknown, "Technical Specification Group Services and System Aspects; Generic Authentication Architecture (GAA); Generic Bootstrapping Architecture (GBA) (Release 12)," Technical Specification 33.220, Version 12.3.0, 3GPP Organizational Partners, Jun. 2014, 92 pages.

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," Technical Specification 36.300, Version 12.5.0, 3GPP Organizational Partners, Mar. 2015, 251 pages.

Blom, Rolf et al., "Security in the Evolved Packet System," Ericsson Review, Keeping wireless communication secure, Jan. 2010, http://www.ericsson.com/br/res/the company/docs/publications/ericsson_review/2010/security_eps.pdf, Ericsson, pp. 4-9.

Schneider, Peter, "How to secure an LTE-network: Just applying the 3GPP security standards and that's it?" Telco Security Day @ Troopers 2012, Version 1.2, Mar. 20, 2012, Nokia Siemens Networks, slides 1-20.

International Search Report and Written Opinion for International Patent Application No. PCT/EP2016/057797, dated Jul. 12, 2016, 11 pages.

* cited by examiner

METHOD, APPARATUS, AND SYSTEM FOR PROVIDING ENCRYPTION OR INTEGRITY PROTECTION IN A WIRELESS NETWORK

RELATED APPLICATIONS

This application is a 35 U.S.C. § 371 national phase filing of International Application No. PCT/EP2016/057797, filed Apr. 8, 2016, which claims the benefit of U.S. Provisional Application No. 62/144,659, filed Apr. 8, 2015, the disclosures of which are incorporated herein by reference in their entireties.

TECHNICAL FIELD

Example embodiments presented herein are directed towards a method, apparatus (e.g., a core network node), and system for providing encryption or integrity protection in a wireless network.

BACKGROUND

In a typical cellular system, also referred to as a wireless communications network, wireless communication devices (WCDs) (such as mobile stations and/or user equipments or user equipment units (UEs)) communicate via a Radio Access Network (RAN) to one or more core networks. The WCDs can be mobile stations or UEs such as mobile telephones (also known as "cellular" telephones), or laptops with wireless capability (e.g., with mobile termination). The UEs can be, for example, portable, pocket-held or hand-held, computer-comprised, or car-mounted mobile devices which communicate voice and/or other forms of data with a radio access network (RAN).

The radio access network covers a geographical area which is divided into cell areas, with each cell area being served by a base station, e.g., a Radio Base Station (RBS), which in some networks is also called "NodeB" or "B node" or "Evolved NodeB" or "eNodeB" or "eNB." A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is generally a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

EPC and E-UTRAN Architectures:

Evolved Packet System (EPS) is the Evolved 3GPP Packet Switched Domain and includes the Evolved Packet Core (EPC) and Evolved Universal Terrestrial Radio Access Network (E-UTRAN).

FIG. 1 is an overview of the EPC architecture. This architecture is defined in 3GPP TS 23.401, which is incorporated by reference herein in its entirety. That specification provides for a definition of the PGW (PDN Gateway), SGW (Serving Gateway), PCRF (Policy and Charging Rules Function), MME (Mobility Management Entity) and user equipment (UE). The LTE radio access network (E-UTRAN) includes one or more eNBs. In FIG. 1, a WCD such as UE 101 can access the EPC via an eNB 103. A MME node 105, SGW 111, PGW 113, PCRF node 115, and home subscriber server (HSS) 117 may facilitate communication with the UE 101.

FIG. 2 shows the overall E-UTRAN architecture and is further defined in, for example, 3GPP TS 36.300. The E-UTRAN comprises eNBs, which provide the E-UTRA user plane (e.g., PDCP/RLC/MAC/PHY) and control plane (RRC) protocol terminations towards the UE. The eNBs are interconnected with each other by means of the X2 interface. The eNBs are also connected by means of the S1 interface to the EPC (Evolved Packet Core), more specifically to a MME (Mobility Management Entity) node via the S1-MME interface and to the Serving Gateway (S-GW) by means of the S1-U interface.

FIG. 3 illustrates parts of the EPC Control Plane (CP) architecture, and FIG. 4 illustrates parts of the EPC User Plane (UP) architecture.

Existing E-UTRAN/EPC Security Mechanism

The security architecture of E-UTRAN/EPC is described in 3GPP TS 33.401 and TS 33.220, the contents of which are incorporated herein in their entirety. The E-UTRAN/EPC security architecture contains several parts:

Authentication and Key Agreement (AKA): this may be performed when a UE is connecting to a system for the first time (initial attach), and at various other times, e.g. when re-authentication is required by the network.

EPS key hierarchy: this may be based on permanent keys stored in the universal subscriber identity module (USIM) and authentication center (AuC), which are used during the AKA to derive session keys delivered to the Mobile Equipment (ME) part of a UE and to a MME node. The master session key may be called $K_{ASME}$, which is used in one or more steps to generate $K_{eNB}$, $K_{NASint}$, $K_{NASenc}$, $K_{UPenc}$, $K_{RRCint}$ and $K_{RRCenc}$, which are keys used for ciphering and integrity protection at different layers. The hierarchy is illustrated in FIG. 6.

Key handling mechanism for distributing and handling of the E-UTRAN session keys from the MME node to the eNB when the UE enters a connected state.

Encryption protection (e.g. performed by UE and eNB) using the E-UTRAN session keys.

Below are some discussions from 3GPP TS 33.401 that describe some mechanism for the architecture.

Evolved Packet System (EPS) Authentication and Key Agreement (AKA) procedure:

EPS AKA is the authentication and key agreement procedure used over E-UTRAN. It requires a Rel-99 or later USIM application on, e.g., a universal integrated circuit card (UICC). The EPS AKA produces key material forming a basis for user plane (UP), RRC, and NAS ciphering keys as well as RRC and NAS integrity protection keys. In this context, a UE (or other WCD) may be logically divided into a mobile equipment (ME) and the USIM.

The EPS AKA procedure is based on the MME node sending to the USIM via the Mobile Equipment (ME) a random challenge RAND and an authentication token AUTN for network authentication. RAND and AUTN may be from a selected authentication vector. The MME receives the authentication vector(s) from the HSS.

At receipt of this message, the USIM may verify the freshness of the authentication vector by checking whether AUTN can be accepted. If so, the USIM computes a response RES. USIM may also compute a Ciphering Key (CK) and an Integrity Key (IK) which are sent to the ME.

The UE (ME and USIM) may respond with a User authentication response message, which may include a value RES in case of successful AUTN verification. In this case the ME may compute $K_{ASME}$ from CK, IK, and a serving network's identity (SN id) using a Key Derivation Function (KDF).

The MME may check that the RES equals XRES. If so, the authentication is successful. If not, depending on the type of identity used by the UE in the initial NAS message, the MME may initiate further identity requests or send an authentication reject message towards the UE.

In the EPS AKA procedure, the following keys are shared between UE and HSS:

K is the permanent key stored on the USIM on a UICC and in the Authentication Center AuC (e.g., in the HSS/AuC).

CK, IK is the pair of keys derived in the AuC and on the USIM during an AKA procedure.

As a result of the authentication and key agreement, key generation data for an intermediate key $K_{ASME}$ may be shared between UE and MME. As illustrated in FIG. 5, in some instances the key generation data may include an index $KSI_{ASME}$ (an index is used so that $K_{ASME}$ is not transmitted). In some instances, $KSI_{ASME}$ is not included.

EPS Key Hierarchy:

The key hierarchy, as illustrated in FIG. 6, includes following keys: $K_{eNB}$, $K_{NASint}$, $K_{NASenc}$, $K_{UPenc}$, $K_{RRCint}$, $K_{RRCenc}$ and $K_{UPint}$. Below is a discussion of derivation of the various keys:

$K_{eNB}$ is a key derived by ME and MME node from $K_{ASME}$ or by ME and target eNB (e.g., during handover from source eNB to target eNB).

Keys for NAS Traffic:

$K_{NASint}$ is a key, which shall only be used for the protection of NAS traffic with a particular integrity algorithm. This key is derived by ME and MME from $K_{ASME}$.

$K_{NASenc}$ is a key, which shall only be used for the protection of NAS traffic with a particular encryption algorithm. This key is derived by ME and MME from $K_{ASME}$.

Keys for UP Traffic:

$K_{UPenc}$ is a key, which shall only be used for the protection of UP traffic with a particular encryption algorithm. This key is derived by ME and eNB from $K_{eNB}$.

$K_{UPint}$ is a key, which shall only be used for the protection of UP traffic between RN and DeNB with a particular integrity algorithm. This key is derived by RN and DeNB from $K_{eNB}$.

Keys for RRC Traffic:

$K_{RRCint}$ is a key, which shall only be used for the protection of RRC traffic with a particular integrity algorithm. $K_{RRCint}$ is derived by ME and eNB from $K_{eNB}$.

$K_{RRCenc}$ is a key, which shall only be used for the protection of RRC traffic with a particular encryption algorithm. $K_{RRCenc}$ is derived by ME and eNB from $K_{eNB}$.

Key Distribution and Handling:

FIG. 7 describes how the session keys are distributed and handled in EPC and E-UTRAN. The HSS receives the CK, IK from HSS/AuC, derives the $K_{ASME}$, which is sent to the MME. The MME derives the keys used for NAS protection ($K_{NASenc}$, $K_{NASint}$) from the $K_{ASME}$ as well as the $K_{eNB}$ sent down to the eNB. $K_{eNB}$ is sent to the eNB when the UE enters E-UTRAN connected mode (RRC connected). The eNB derives the RRC encryption and integrity protection keys ($K_{RRCen}$ and $K_{RRnt}$) as well as user plane encryption key $K_{UPenc}$. $K_{UPint}$ is only used for Relay Nodes and is not discussed further.

On the terminal side all of these steps are performed internally in the UE (or other WCD). The E-UTRAN session keys ($K_{RRCen}$, $K_{RRCint}$ and $K_{UPenc}$) are activated during the RRC Security Mode Command procedures.

Encryption of user plane data and control plane signaling in EUTRAN and UE:

FIG. 8 illustrates the encryption and decryption procedure performed in the E-UTRAN and the UE. The procedure includes a sender (e.g., E-UTRAN sending downlink data, or UE sending uplink data) encrypting the data by bit-wise XORing a keystream block with the data block of the same length. The keystream block is generated by an encryption algorithm which takes an encryption key and a unique sequence number for the data block. If the data is RRC signalling, $K_{RRcenc}$ is used. If it is user plane data, $K_{UPenc}$ is used as key. In the receiver (E-UTRAN receiving uplink data, or UE receiving downlink data), the same procedure is performed using the same key and sequence number. Using bitwise XOR twice with the same keystream will again generate the plaintext data.

SUMMARY

The present application relates to a method, apparatus, and system for providing encryption or integrity protection in a wireless network. One aspect of this application relates to providing encrypted and/or integrity-protected communication between a WCD (e.g., UE) and a eNB, but doing so using an authentication and key agreement (AKA) procedure that is different than EPS AKA. Generally speaking, EPS AKA may involve requiring a WCD to have a USIM (e.g., in the form of a universal integrated circuit card (UICC)) that stores, e.g., an international mobile subscriber identity (IMSI), and may involve using such USIM-based authentication data to derive various keys (e.g., $K_{ASME}$, $K_{eNB}$) and to derive various response values (e.g., RES, XRES) used to authenticate the WCD. This application may involve using a different AKA procedure than EPS AKA to still establish encryption and/or integrity protection for a communication in an EPS context, such as a communication between an eNB and a UE. In some instances, this may involve using non USIM-based authentication data (e.g., using user ID and password, where the user ID is not an IMSI; or using a x.509 certificate). In some instances, this may involve using USIM-based authentication data or non USIM-based authentication data in a manner that is different than in EPS AKA. For example, it may involve using a certificate authority (CA) to perform authentication (e.g., as part of EAP-TLS), in addition to or instead of comparing XRES with RES and MAC with XMAC. As another example, it may involve modifying or omitting the EPS AKA key derivation process, such as by modifying or omitting the process of converting a LTE security key K of a predetermined length (e.g., 256 bits) to a ciphering key CK and integrity key IK with a HMAC-SHA-256 key derivation function, followed by deriving $K_{ASME}$ from CK and IK, and deriving $K_{eNB}$ from $K_{ASME}$.

One aspect of the present application relates to using an AKA procedure that is different than EPS AKA, but still doing so in a way that avoids or minimizes the changes needed to the RAN implementation. More specifically, current cellular networks that use EPS AKA may be mainly built around supporting voice services and mobile broadband (MBB) services. However, new services such as intelligent transport systems, factory or process automation systems may need to be supported as well in the cellular systems, and such services may have different requirements. It is desirable to support the new services by using common, existing infra-structure (e.g., radio, transport, networking, processing, and storage) and functional components (e.g. mobility manager), when applicable, while still making it possible to optimize the network when it comes to deployment, functionality needed, scalability etc. for the particular new services. In some implementations, this may involve creating a KeNB which has a format (e.g., length) that matches what an existing eNB expects in an EPS AKA context, even if an AKA procedure different than EPS AKA is being used. This may involve, e.g., certain conversion(s) being performed in a MME node and/or authentication center (e.g., HSS), such as converting a non-USIM based key to a length which matches a $K_{eNB}$ key or a $K_{ASME}$ key from which $K_{eNB}$ can be derived.

One aspect of the present application relates to allowing WCDs to be authenticated in an EPC network without having USIM-based credentials, or with using USIM-based credentials in an authentication procedure that is faster, less computing-intensive, and/or easier to implement. More specifically, one issue with current cellular networks based on 2G/3G/E-UTRAN/EPC is that they may only support authentication mechanism based on 3GPP defined EPS AKA procedure, which uses (U)SIM (UICC) based credentials. This means that in order to use a 2G/3G/LTE system, a WCD may have to be equipped with SIM or embedded SIM. This may be acceptable for typical Voice and Mobile Broadband use cases, but for some new services (e.g., WCDs used in factory automation, as extremely low cost sensors/actuators, or in enterprise services) may desire to support alternative authentication and/or key agreement methods. This could be due to the cost or size of the SIM related hardware, which may be high in relation to the overall cost of a low cost sensor or other similar WCD, or could arise from a desire to use a different (non USIM-based) credential which is already used within a vertical industry or enterprise environment.

As discussed above, however, it is still desirable to be able to reuse infrastructure, such as an eNB, that is part of the EPS AKA framework. Thus, at least one object of the example embodiments presented herein is to introduce a mechanism for allowing any authentication procedure (e.g., EAP, such as PEAP or EAP-TLS) and any credential or form of UE identity (e.g., user name/password, certificates such as x.509), to connect to a 3GPP-based radio interface (e.g. a LTE radio interface or WCDMA radio interface for UMTS), without impacting the RAN and the lower layer of the UE protocol stack (terminating in the RAN).

In some cases, one way of achieving this object is through a novel conversion mechanism implemented in the network and/or in the WCD, to convert a session key generated by an authentication procedure different than EPS AKA to one or more keys used for access security (e.g. access security in the E-UTRAN and/or EPC). The mechanism can be deployed for specific subscribers or WCD types (possibly within a specific network partition) without impacting other users. The session key may be generated based on non USIM-based authentication data, and/or may have a different format (e.g., different length) than a format (e.g., a key length of 256 bits) used in the EPS AKA procedure. At least one example advantage of some of the example embodiments presented herein is that it makes it possible to support new use cases requiring different security mechanism without impacting RAN and or existing users. This allows for a smooth introduction of these features in the system.

One aspect of the present application relates to combining the different AKA procedures with the use of different network partitions. For instance, it is a desire to provide isolation between different users of the common infrastructure to prevent one user associated with one or more services from causing problems to other users and services. In some cases, different AKA procedures may be associated with different network partitions. More specifically, an evolved packet core (EPC) network may be divided into different network partitions. One of the partitions may handle MBB traffic, while another partition may be configured to handle machine-type communication (MTC) traffic. In these cases, a WCD attempting to access the MBB partition may still use EPS AKA, while a WCD attempting to access the MTC partition may still use an AKA different than EPS AKA. Thus, a selection or other determination of which AKA procedure to use may be made based on which network partition the WCD is ultimately attempting to access.

One aspect of the present disclosure relates to a method in a core network node for establishing encryption or integrity protection. The method may comprise identifying a non-USIM based authentication procedure to be utilized by a wireless communication device (WCD) being served by the core network node. In an embodiment, the core network node may obtain a session key associated with the identified non-USIM based authentication procedure. In an embodiment, the core network node may convert the session key associated with the identified non-USIM based authentication procedure to at least one of: i) a first key, $K_1$, for use by the WCD and a base station serving the WCD to derive an encryption or integrity protection key, $K_{enc/int}$, for enabling encryption or integrity protection of a communication between the WCD and the base station and ii) a second key, $K_2$, for use by the WCD and the core network node to derive the first key $K_1$. In some embodiments, the core network node performs at least one of: i) sending $K_1$ to the base station and ii) sending $K_2$ to another core network node that is configured to derive $K_1$ from $K_2$. In some cases, $K_1$ and $K_2$ each has a length that is at least one of the following: i) equal to a length of an evolved packet system authentication and key agreement (EPS AKA) key, and ii) different than a length of the session key. In an embodiment, K1 and K2 may each be a key that has the same length and/or is used in the same way as an EPS AKA key.

In some implementations, the core network node is a mobility management entity (MME), node. There, obtaining the session key comprises receiving the session key from an authentication server, wherein the session key is converted to $K_1$, and wherein $K_1$ is sent from the MME node to the base station serving the WCD. In some cases, $K_1$ is the $K_{eNB}$ key used in the EPS AKA procedure, and converting the session key comprises mapping the session key to a $K_{eNB}$ format. In some scenarios, the session key is longer than a predefined key length of the $K_{eNB}$ format, and wherein mapping the session key to the $K_{eNB}$ format comprises extracting a portion of the session key to be $K_{eNB}$, wherein the extracted portion has the predefined key length. In some scenarios, the session key is shorter than the predefined key length of the $K_{eNB}$ format, and mapping the session key to the $K_{eNB}$ format comprises padding the session key with additional bits to be $K_{eNB}$. The padded session key may have the predefined key length.

In some cases, converting the session key to $K_1$ may comprise inputting the session key into a key derivation function, KDF, to output the $K_1$, wherein the KDF is a keyed-hash-message-authentication-code function using a secure hash algorithm, HMAC-SHA.

In some implementations, the core network node is an authentication server (e.g., HSS). Obtaining the session key may comprise generating the session key, wherein the session key is converted to $K_2$, and wherein $K_2$ is sent to a MME node. In some cases, $K_2$ is an access security management entity key, $K_{ASME}$, used in a EPS AKA procedure, and wherein converting the session key comprises mapping the session key to a $K_{ASME}$ format. In some scenarios, the session key is longer than a predefined key length of the $K_{ASME}$ format, and mapping the session key to the $K_{ASME}$ format may comprise extracting a portion of the session key to be $K_{ASME}$, wherein the extracted portion has the predefined key length. In some scenarios, the session key is shorter than the predefined key length of the $K_{ASME}$ format, and mapping the session key to the $K_{ASME}$ format comprises padding the session key with additional bits to be $K_{ASME}$, wherein the padded session key has the predefined key length.

In some cases, converting the session key to $K_{ASME}$ comprises inputting the session key into a key derivation function, KDF, to output the $K_{ASME}$, wherein the KDF is a keyed-hash-message-authentication-code function using a secure hash algorithm, HMAC-SHA.

In some implementations, the method further comprises: obtaining key generation data that is associated with the identified non-USIM based authentication procedure and that is for use in deriving the session key; and sending the key generation data to the WCD.

In some implementations, identifying the non-USIM based authentication procedure comprises identifying, from among a plurality of network partitions, a network partition to which the WCD is attempting to connect, and determining that the network partition is associated with the non-USIM based authentication procedure.

In some implementations, identifying the non-USIM based authentication procedure comprises determining that the core network node has received at least one of the following from the WCD: i) a user identifier and password, wherein the user identifier does not have an international mobile subscriber identity, IMSI, format and a password, and ii) a certificate.

In some implementations, identifying the non-USIM based authentication procedure comprises receiving an indication of authentication type from the WCD, the indication associated with a non-USIM authentication procedure.

In some implementations, identifying the non-USIM based authentication procedure comprises receiving subscription information associated with the WCD and accessing a database which associates subscription information with authentication procedure.

In some implementations, identifying the non-USIM based authentication procedure comprises determining, from a device type of the WCD, that the WCD is not a mobile broadband, MBB, device.

One aspect of the present disclosure relates to a method, in a wireless communication device, WCD, for establishing encryption or integrity protection with a base station serving the WCD. In an embodiment, the method comprises the WCD sending, to a mobility management entity, MME, node, non-USIM based authentication data. The WCD may receive, from the MME node, key generation data associated with the non-USIM based authentication data. The WCD may generate a non-USIM based session key using the key generation data. The WCD may convert the non-USIM based session key to an encryption or integrity protection key, $K_{enc/int}$, for use by the WCD and the base station in encrypting or integrity protecting communication between the WCD and the base station. The WCD may send, to the base station, communication that is encrypted or integrity protected using the encryption or integrity protection key converted from the session key. In an embodiment, the encryption or integrity protection key $K_{enc/int}$ has a length that is at least one of the following: i) equal to a length of an evolved packet system authentication and key agreement (EPS AKA) key, and ii) different than a length of the session key. In an embodiment, Kenc/int may be a key that has the same length and/or is used in the same way as an EPS key.

In some implementations, converting the session key to $K_{enc/int}$ comprises: converting the session key to a first key, $K_1$, for use by the WCD and the base station to derive $K_{enc/int}$; converting $K_1$ to $K_{enc/int}$ by inputting $K_1$ and an algorithm distinguisher value into a key derivation function, KDF, wherein the KDF is a hash function, and wherein the algorithm distinguisher value distinguishes between whether the output of the KDF is being used to perform encryption or integrity protection, and distinguishes between whether the output of the KDF is being used for radio resource control, RRC, signaling or for user plane, UP, signaling.

In some implementations, converting the session key to $K_1$ comprises converting the session key to a second key $K_2$, and converting $K_2$ to $K_1$ by inputting K2 into the KDF.

In some implementations, the key generation data comprises an identification of a type of authentication procedure between i) the WCD and the MME node or ii) the WCD and an authentication server to which the MME node is connected.

In some implementations, the non-USIM based authentication data comprises at least one of: i) user identifier and password, wherein the user identifier does not have an IMSI format, and ii) a certificate.

In some implementations, the method further comprises sending at least one of: i) an identifier of a network partition the WCD is attempting to access, ii) an identifier of an authentication procedure to be used for authenticating the WCD, iii) a device type of the WCD, and iv) subscription information associated with the WCD.

One aspect of the present disclosure relates to a method, in a core network node, for establishing encryption or integrity protection. The method may comprise the core network node using an authentication and key agreement, AKA, procedure that is different than EPS AKA to authenticate a wireless communication device, WCD, and to generate a session key. The core network node may convert the session key to at least one of: i) a first key, $K_1$, for use by the WCD and a base station serving the WCD to derive an encryption or integrity protection key, $K_{enc/int}$, for enabling encryption or integrity protection of a communication between the WCD and the base station and ii) a second key, $K_2$, for use by the WCD and the core network node to derive the first key $K_1$. The core network node may transmit $K_1$ to the eNB or $K_2$ to a MME node connected to the eNB. In an embodiment, $K_1$ and $K_2$ each has a length that is at least one of: i) equal to a length of an evolved packet system authentication and key agreement (EPS AKA) key, and ii) different than a length of the session key. In some cases, K1 and K2 may each be a key that has a same length and/or is used in the same way as an EPS AKA key.

In an embodiment, the method further comprises receiving a message from the WCD for accessing a core network in which the core network node is located; and determining, based on information in the message, whether an authentication and key agreement, AKA, procedure that is different than evolved packet system AKA, EPS AKA, should be performed for authenticating the WCD, wherein converting the session key is performed in response to determining that the AKA procedure is different than EPS AKA.

In some implementations, using the AKA procedure that is different than EPS AKA to authenticate the WCD comprises the core network node receiving non-USIM authentication data that is at least one of: i) a user identifier and password, wherein the user identifier does not have an IMSI format and ii) a certificate.

In some implementations, using the AKA procedure that is different than EPS AKA to authenticate the WCD comprises not performing all of the following: i) the core network node obtaining an expected response value, XRES, based on a predetermined key, K, associated with USIM-based authentication data received from the WCD, ii) the core network node receiving a response value, RES, from the WCD, wherein RES is based on a key stored in the WCD that is the same predetermined key K or a different predetermined key, and iii) the core network node comparing RES with XRES.

In some implementations, using the AKA procedure that is different than EPS AKA to obtain an encryption or integrity protection key comprises converting the session key directly to $K_1$, without converting the session key to $K_2$, wherein $K_1$ is the $K_{eNB}$ key used in the EPS AKA procedure and $K_2$ is the access security management entity key, $K_{ASME}$, used in the EPS AKA procedure.

One aspect of the present disclosure relates to a wireless communication device, WCD, for establishing encryption or integrity protection. The method may comprise receiving key generation data from a core network node. The WCD may use i) an authentication and key agreement procedure that is different than evolved packet system authentication and key agreement (EPS AKA) and ii) the key generation data to authenticate the core network node and generate a session key. The WCD may convert the session key to an encryption or integrity protection key, $K_{enc/int}$, for use by the WCD and the base station in encrypting or integrity protecting communication between the WCD and the base station. The WCD may send, to the base station, communication that is encrypted or integrity protected using the encryption or integrity protection key converted from the session key. In an embodiment, the encryption or integrity protection key $K_{enc/int}$ has a length that is at least one of: i) equal to a length of an evolved packet system authentication and key agreement (EPS AKA) key, and ii) different than a length of the session key. In an embodiment, Kenc/int is a key that has the same length and/or is used in the same way as an EPS AKA key.

In some implementations, the method further comprises transmitting to the core network node a message with information indicating whether an AKA procedure different than EPS AKA should be performed for authenticating the WCD.

In some implementations, using the AKA procedure that is different than EPS AKA to authenticate the core network node comprises not performing all of the following: i) the WCD obtaining an expected message authentication code, XMAC, based on a predetermined key, K, stored in the WCD, ii) the WCD receiving a message authentication code, MAC, from the core network node, wherein the MAC is based on a key obtained by the core network node that is the same predetermined key K or a different predetermined key, and iii) the WCD comparing MAC with XMAC.

In some implementations, using the AKA procedure that is different than EPS AKA to obtain an encryption or integrity protection key comprises converting the session key directly to a first key, $K_1$, without converting the session key to $K_2$, wherein $K_1$ is the $K_{eNB}$ key used in the EPS AKA procedure and $K_2$ is the access security management entity key, $K_{ASME}$, used in the EPS AKA procedure.

These and other aspects and embodiments are further described herein.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc., in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

Figure 1:
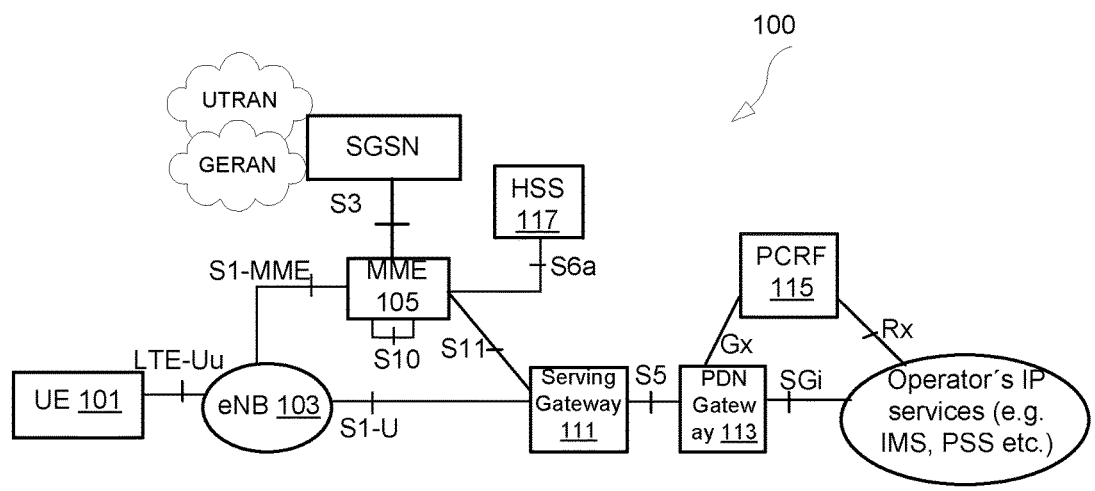
FIG. 1 is an illustrative example of non-roaming EPC architecture for 3GPP accesses.
Figure 2:
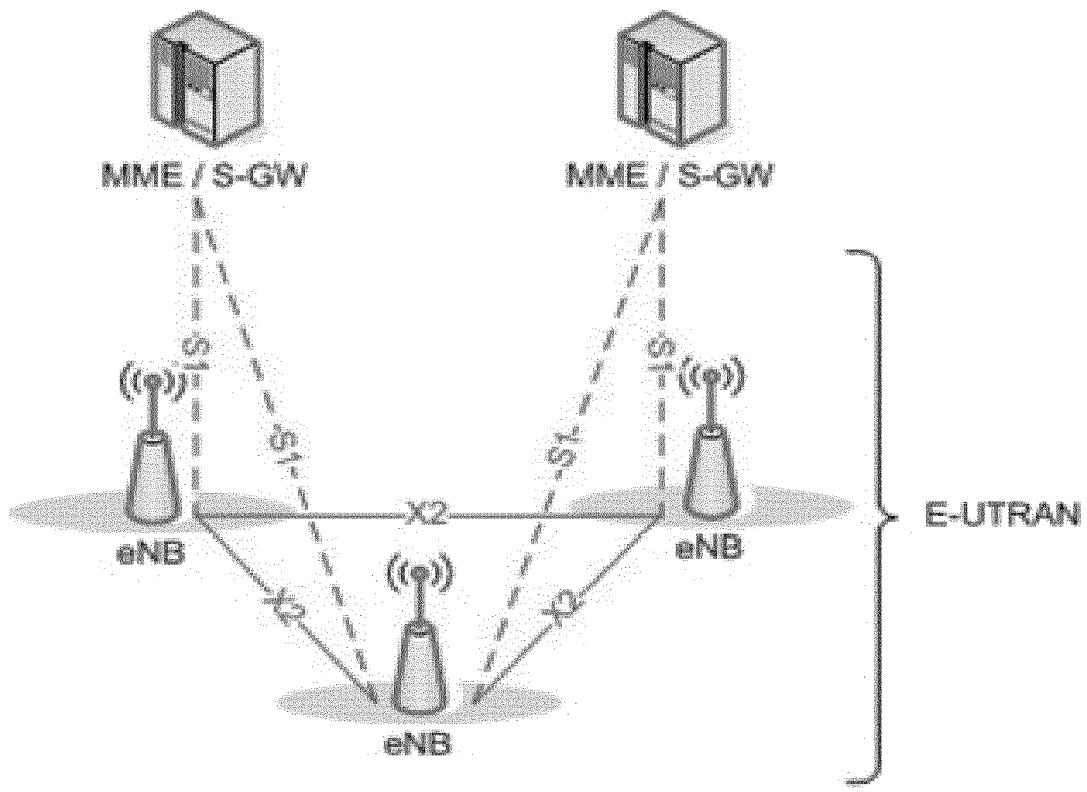
FIG. 2 is an illustrative example of E-UTRAN architecture.
Figure 3:
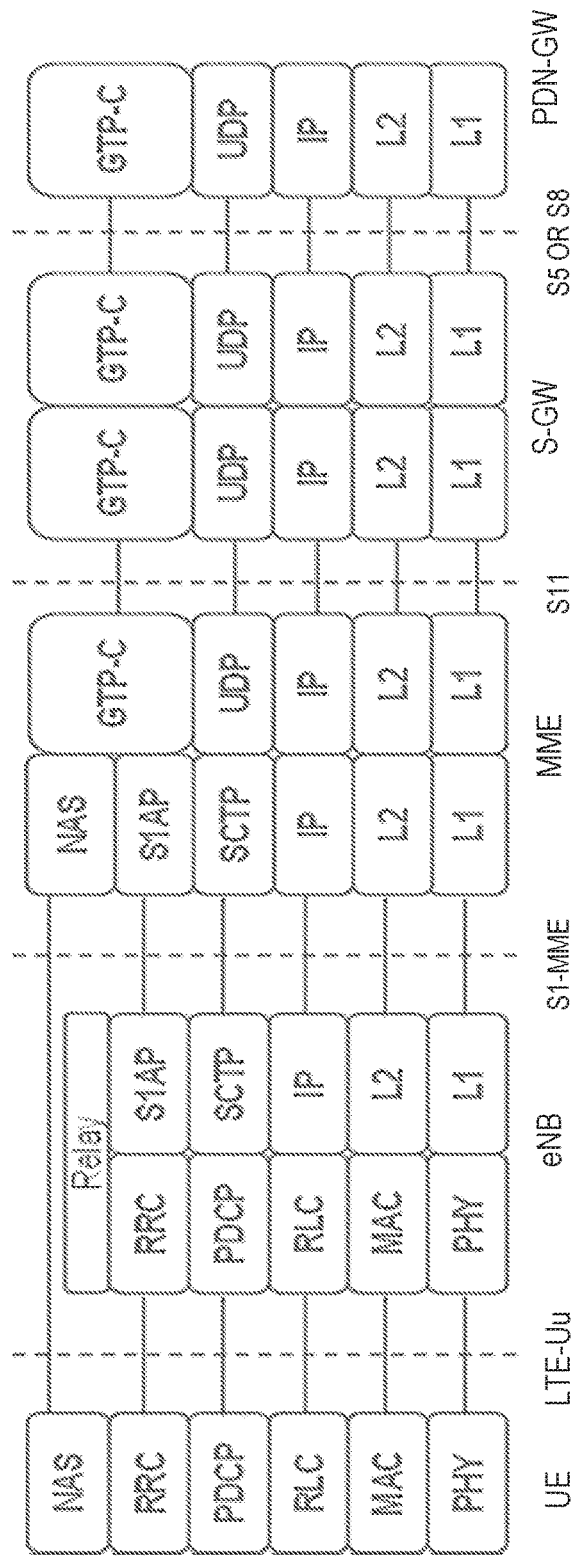
FIG. 3 is a schematic illustrating EPC control plane protocol architecture.
Figure 4:
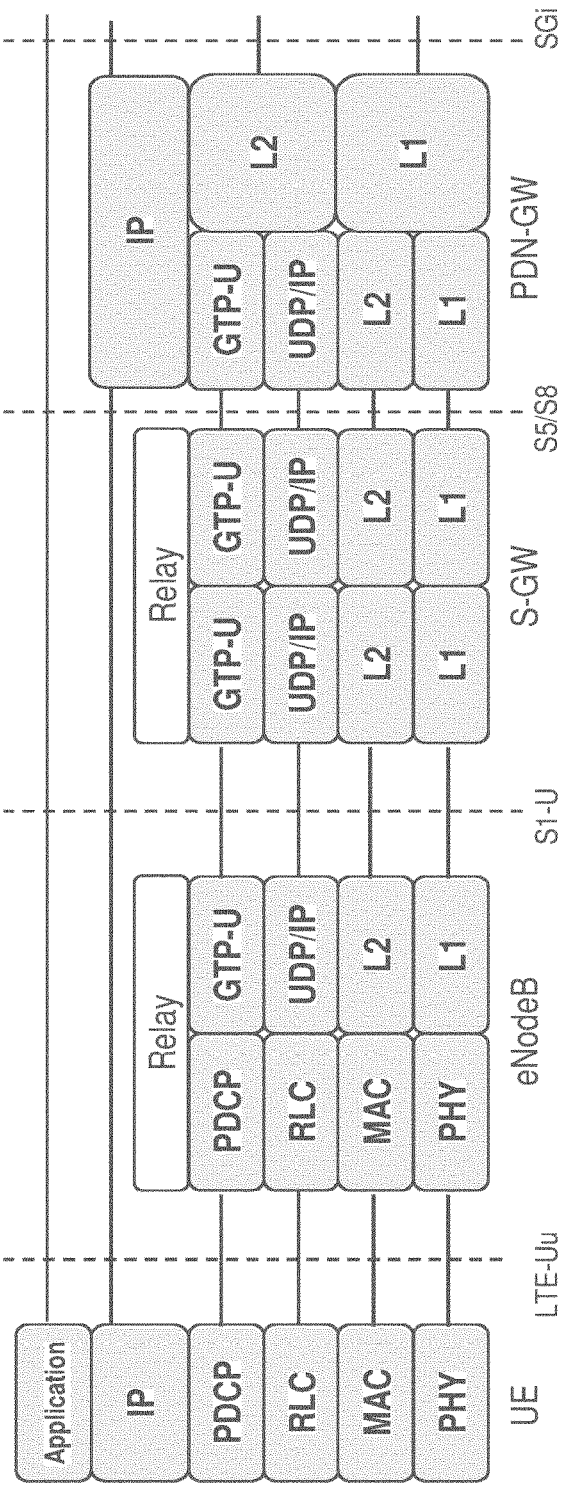
FIG. 4 is a schematic illustrating EPC user plane protocol architecture.
Figure 5:
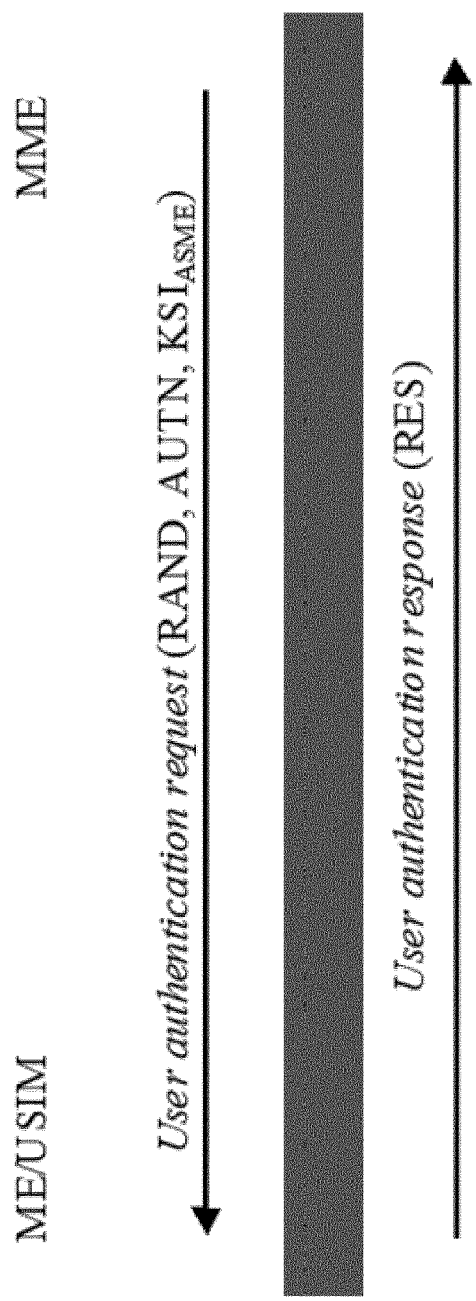
FIG. 5 is an illustration of signaling involved in EPS AKA.
Figure 6:
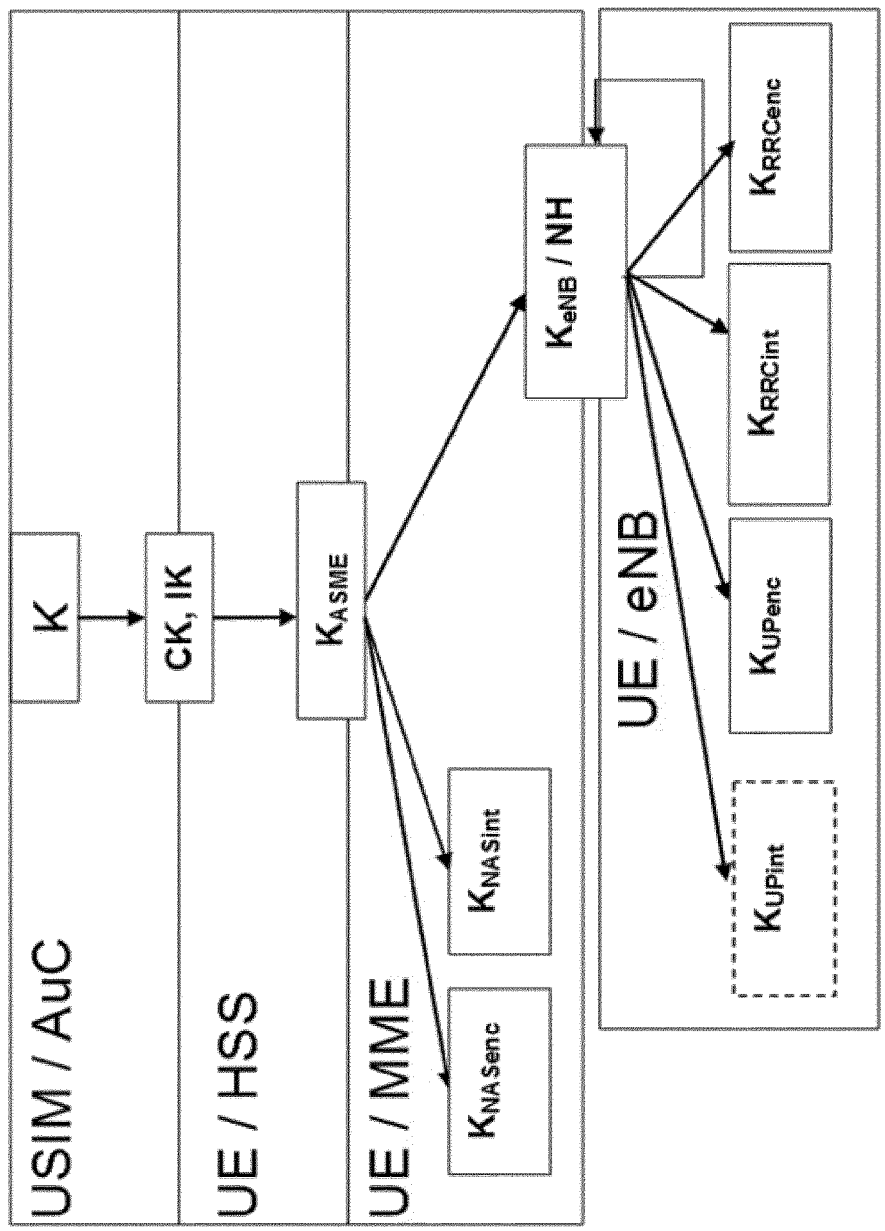
FIG. 6 is an illustration of the EPS key hierarchy.
Figure 7:
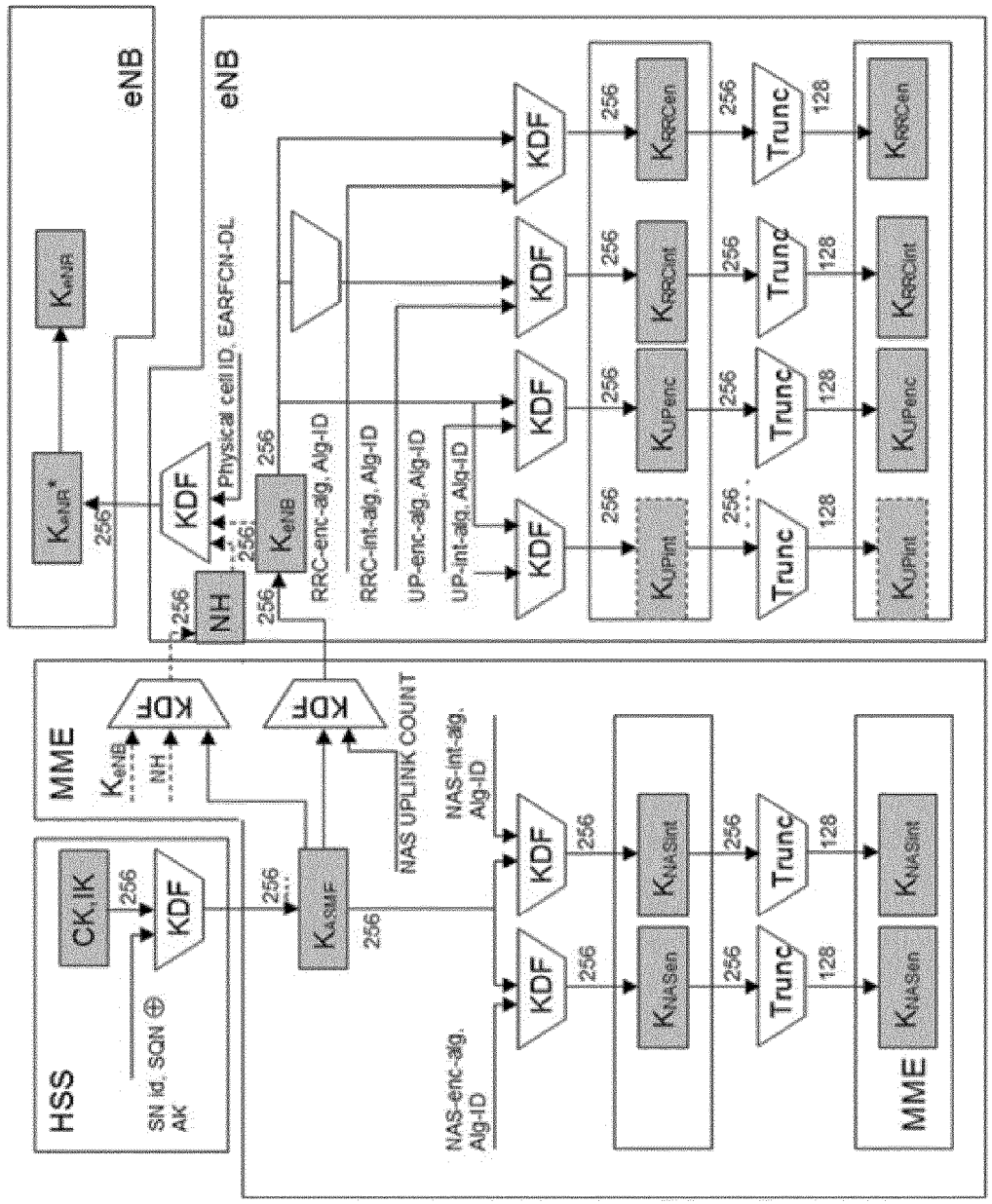
FIG. 7 is an illustration of key distribution and derivation in EPS AKA.
Figure 8:
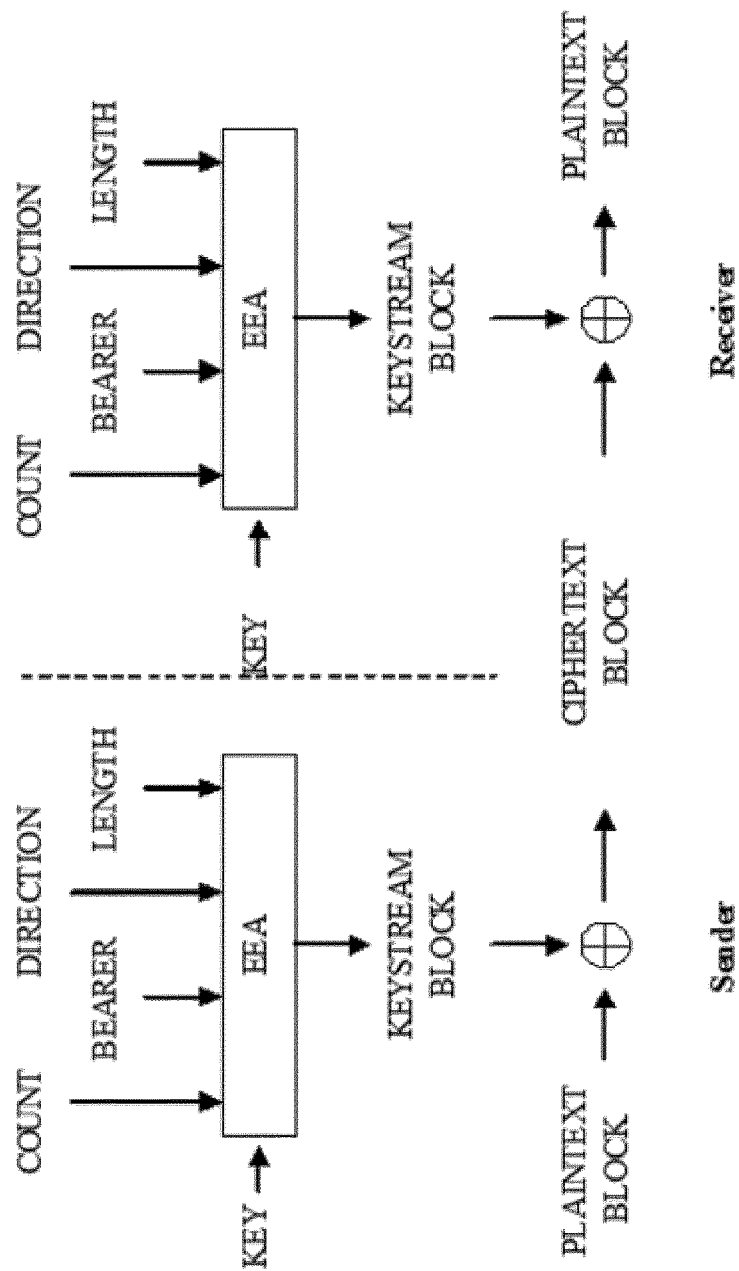
FIG. 8 is an illustration of encryption and decryption procedure performed in a E-UTRAN or UE.
Figure 9:
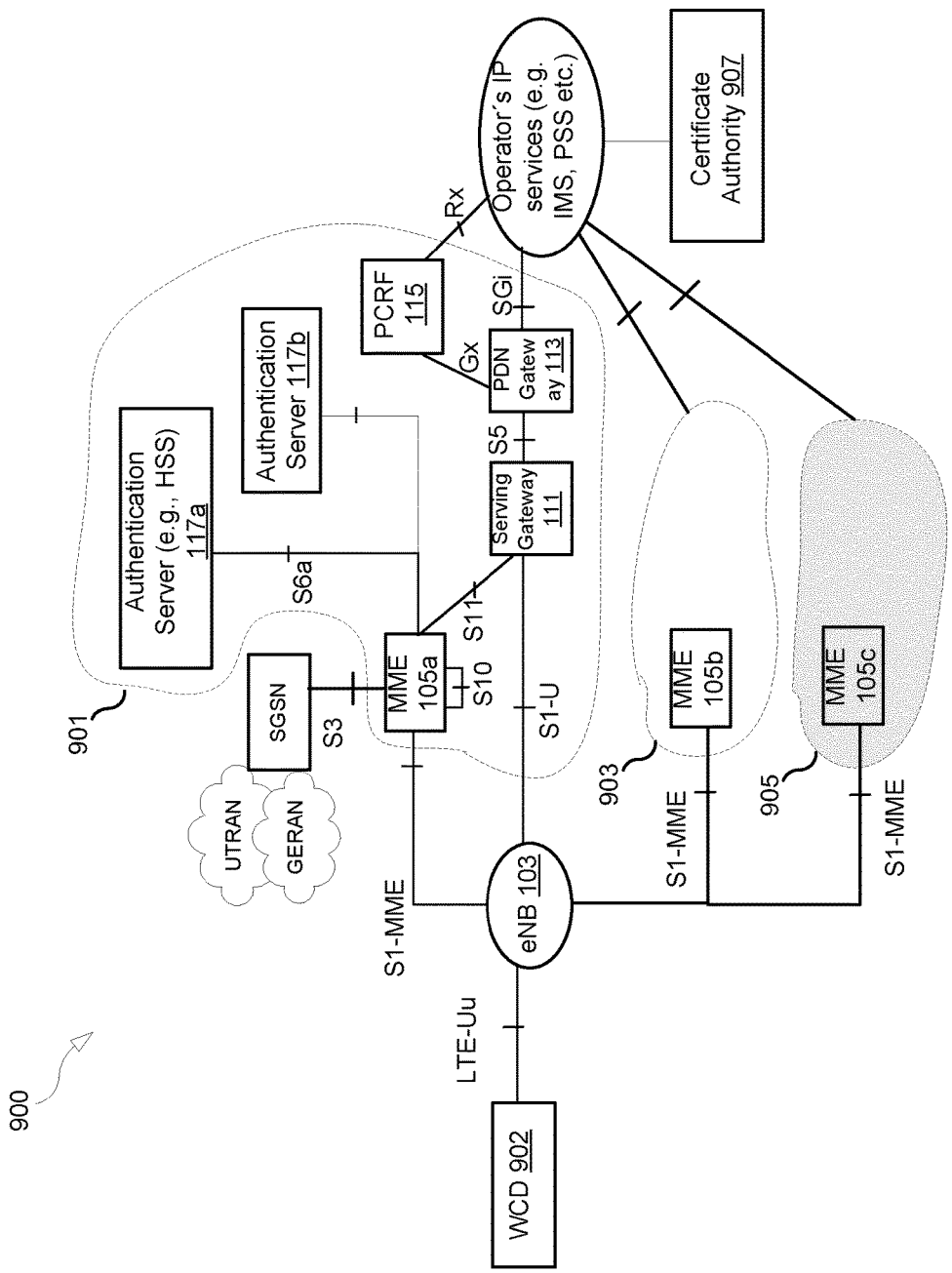
FIG. 9 is an illustration of an example system according to aspects of the present disclosure.

FIG. 9 illustrates an example system 900 that includes a WCD 901 (e.g., a UE) that may communicate with an eNB 103 to access a core network, such as an EPC network. The EPC network in FIG. 9 may be divided into different network partitions 901, 903, and 905. Network partitions are discussed in more detail below. In one example, network partition 901 may be assigned to handle communication with UEs or other WCDs that are mobile broadband (MBB) devices; network partition 903 may be assigned to handle communication with UEs that are sensors in a factory automation setting; and network partition 905 may be assigned to handle voice over LTE (VoLTE) traffic. In some cases, network partitions may share components. In some cases, there may be no overlap between two network partitions. In the example in FIG. 9, each of the network partitions 901, 903, 905 may have a mobility management entity (MME) node, such as MME node 105a, 105b, and 105c, respectively. In other examples, some network partitions may have no MME node.

In FIG. 9, the MME nodes 105a, 105b, and 105c may be involved in performing authentication in their own respective network partitions. In another example, one of the network partitions (e.g., 903) may have no MME node, and the MME node in another partition (e.g., MME node 109a in partition 901) may assist the former partition in performing authentication and/or key agreement. As discussed below in more detail, one instance where this may occur is if, e.g., partition 901 is a default partition to which WCDs may transmit a network attach request message. The MME node in partition 901 may re-route a WCD to another partition, if necessary. In such a situation, the MME node in the default partition may perform authentication and key agreement on behalf of the other network partition, such as if the other network partition does not have AKA capabilities.

FIG. 9 illustrates a network partition 901 that includes a MME node 105a and one or more authentication servers 117a/117b. The authentication server 117a may be the same node as a home subscriber server (HSS), while the authentication server 117b may be a different node than the HSS. In the embodiment illustrated in FIG. 9, the network partition 901 may also include SGW 111, PGW 113, and PCRF node 115. One of more of these components may be duplicated in other network partitions, or may reside in only network partition 901. FIG. 9 further shows a certificate authority (CA) 907 that resides outside the EPC network, though in other embodiments it may reside inside the EPC network. The CA may be used in an AKA procedure that is different than EPS AKA. For instance, EAP-TLS may use a CA to authenticate a WCD.

Figure 10:
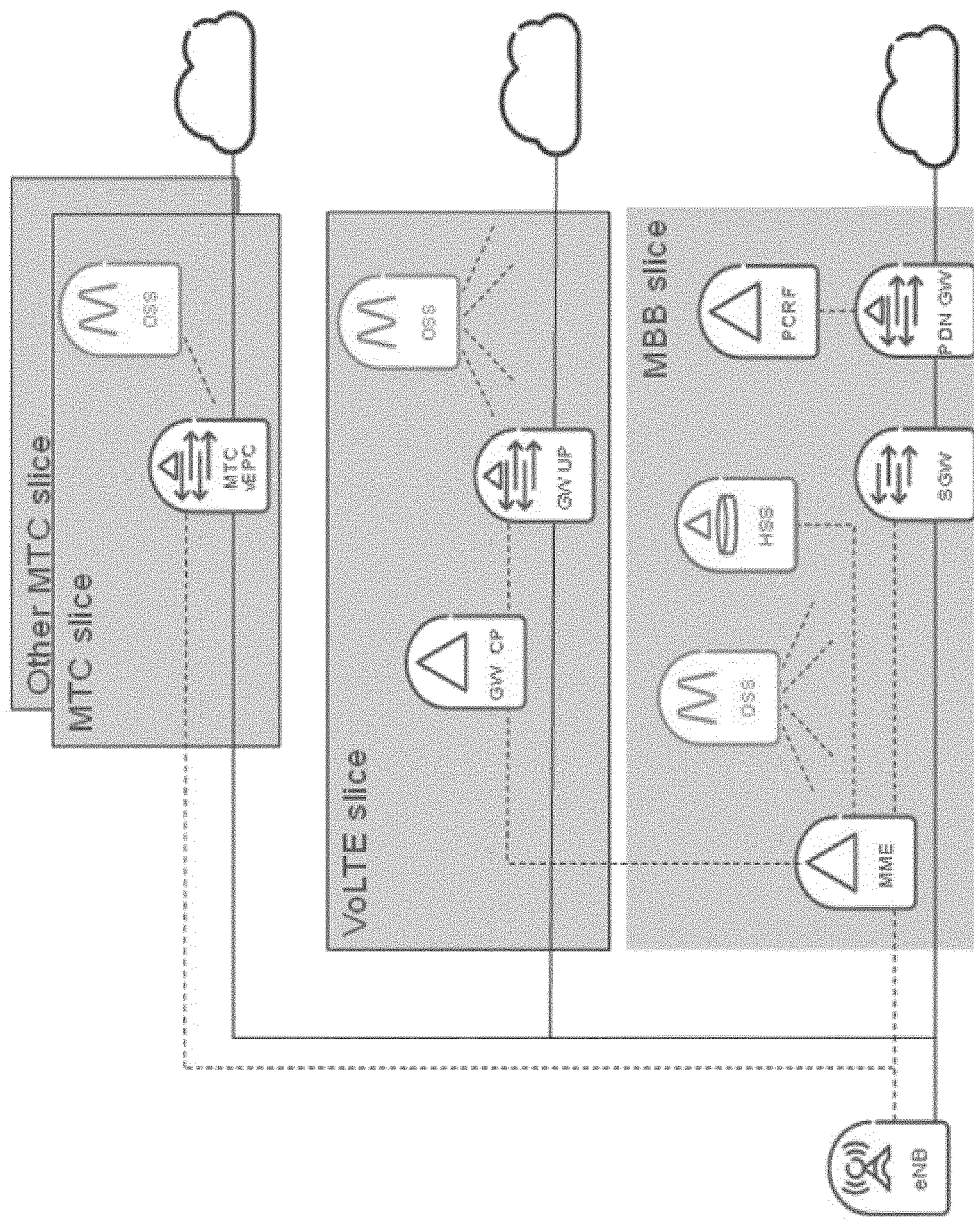
FIG. 10 is an illustration of network partitions (e.g., slices) according to an aspect of the present disclosure.

FIG. 10 illustrates an aspect of network partitioning. More specifically, it illustrates an aspect of network partitioning in which an EPC network is divided into several different parts or slices, also called partitions. In some instances, different partitions support different services and handle different users and/or device types. The actual functional components of the different partitions may be supported on the same infrastructure (e.g., when using Network Functional Virtualization NFV), or the components can use different hardware.

Network partitioning can be deployed in several different layers of the network. In an embodiment, network partitioning of an EPC network may assume a common RAN and radio interface supporting several different EPC partitions. Other possible places to deploy network partitioning includes between S-GW and PDN GW, or between network layer and service layer (e.g. IMS). Additional aspects of network partitioning are discussed later in this application.

Figure 11:
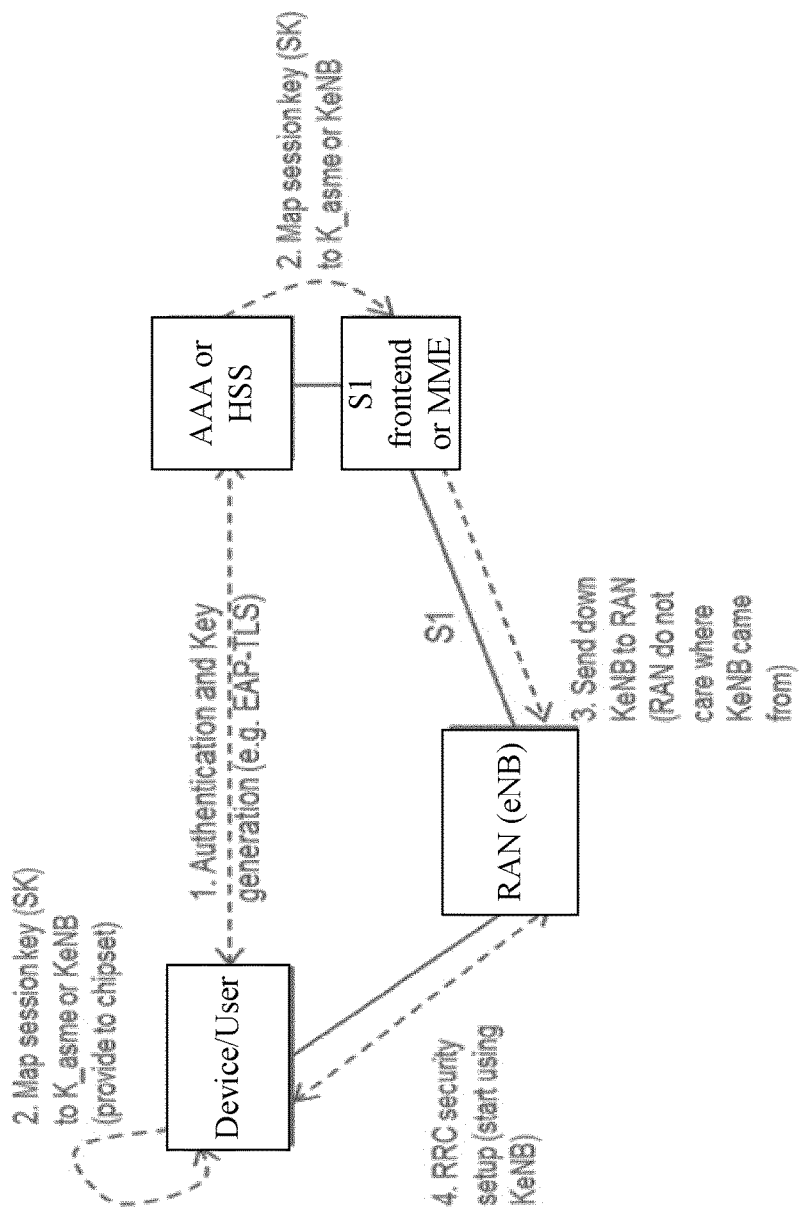
FIG. 11 is an illustration of example signaling for performing authentication and key agreement, according to an aspect of the present disclosure.

Generally speaking, some embodiments in this application are directed towards a mechanism in WCDs and core networks for enabling different authentication procedures and credentials to be supported using existing E-UTRAN/EPC implementation. The existing E-UTRAN implementation may, for example, expect to receive a $K_{eNB}$ that is of a predetermined length (e.g., 256 bits), and may convert $K_{eNB}$ into encryption and/or integrity protection keys, such as $K_{RRCenc}$, $K_{RRCint}$, and $K_{UPenc}$. In an embodiment, the mechanism may generally comprise i) identifying which authentication mechanism shall be used, ii) supporting the exchange of authentication and key agreement (AKA) signaling between the WCD and the core network, and converting the outcome of the session keys generated by the different authentication procedures to keys usable by E-UTRAN/EPC (e.g., to $K_{eNB}$ or a key from which $K_{eNB}$ can be derived, such as $K_{ASME}$). FIG. 11 illustrates exchange of AKA signaling and converting (e.g., mapping) a session key to a key usable by E-UTRAN/EPC. The AKA signaling may correspond to, e.g., an authentication procedure such as extensible authentication protocol (EAP) transport layer security (TLS). The session key may be converted to a key, such as $K_{ASME}$ or $K_{eNB}$, usable by E-UTRAN/EPC. For instance, the session key may be converted (e.g., mapped) to $K_{eNB}$ by both a WCD and a MME node or other S1 front-end device (e.g., a device which communicates with a RAN using the S1 interface). The MME node may send $K_{eNB}$ to the RAN (e.g., to the eNB of an E-UTRAN). The WCD and the RAN may both derive an encryption or integrity protection key $K_{enc/int}$, such as $K_{RRCint}$, $K_{RRCenc}$, or $K_{UPenc}$, using $K_{eNB}$, and communicate with each other using the encryption or integrity protection key.

Figure 12:
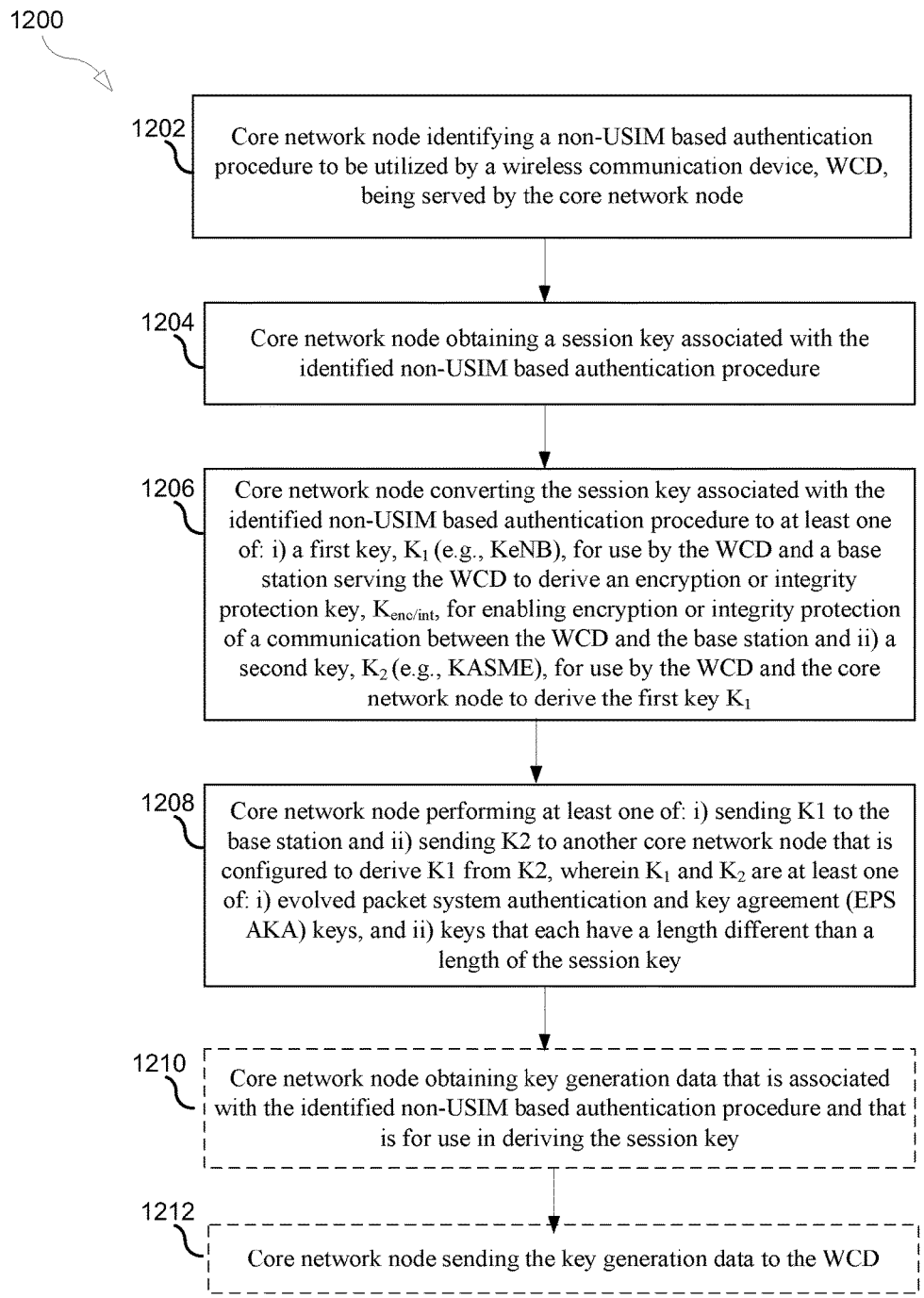
FIGS. 12-15 are illustration of example steps performed according to an aspect of the present disclosure.

FIG. 12 illustrates an example method 1200 in a core network node (e.g., a MME node or an Authentication Server such as a HSS) for establishing encryption or integrity protection. In an embodiment, the method 1200 begins at step 1202, in which the core network node identifies a non-USIM based authentication procedure to be utilized a wireless communication device, WCD, being served by the core network node. A non-USIM based authentication procedure may be an authentication procedure, e.g., that does not rely on IMSI or other USIM-based authentication data. As discussed in more detail below, this step may be based on information in a message (e.g., NAS attach or other network attach request message) from a WCD. For instance, if the message includes a user ID and password (and no IMSI), then the core network node may determine that a non-USIM based authentication procedure should be utilized.

In step 1204, the core network node obtains a session key associated with the identified non-USIM based authentication procedure. An example of a non-USIM based authentication procedure may be an authentication procedure based on a user ID/password combination (in which the user ID is not IMSI), or a X.509 certificate. In some cases, the session key may be stored in the core network node. In some cases, the session key may obtained by retrieving it from an external database or other storage device. The database may, e.g., associate authentication data with session keys. The session key may, e.g., have a different format than an EPS AKA key. For example, an EPS AKA key such as $K_{ASME}$ or $K_{eNB}$ may have 256 bits, while the session key may be shorter or longer.

In step 1206, the core network node converts the session key associated with the identified non-USIM based authentication procedure to at least one of: i) a first key $K_1$ (e.g., $K_{eNB}$) for use by the WCD and a base station (e.g., eNB) serving the WCD to derive an encryption or integrity protection key $K_{enc/int}$ (e.g., $K_{RRCenc}$, $K_{RRCint}$, or $K_{UPenc}$) for enabling encryption or integrity protection of a communication between the WCD and the base station and ii) a second key $K_2$ (e.g., $K_{ASME}$) for use by the WCD and the core network node to derive the first key $K_1$. This conversion may allow a non-USIM based authentication procedure to be used without impacting an existing eNB, which may continue to use $K_1$ (e.g., $K_{eNB}$) to derive $K_{enc/int}$ to communicate with the WCD, just as in the EPS AKA context. In some cases, the MME node may also be unaffected. In such cases, the core network node may be an authentication server that generates $K_2$ (e.g., $K_{ASME}$). The MME node may continue to use $K_{ASME}$ to derive $K_{eNB}$ for the eNB, just as in the EPS AKA context.

More specifically, in some cases, the core network node is a mobility management entity (MME) node, wherein obtaining the session key comprises receiving the session key from an authentication server, wherein the session key is converted to $K_1$, and wherein $K_1$ is sent from the MME node to the base station serving the WCD. As an example, $K_1$ is the $K_{eNB}$ key used in the EPS AKA procedure, and converting the session key comprises mapping the session key to a $K_{eNB}$ format. In some cases, the session key is longer than a predefined key length of the $K_{eNB}$ format, and mapping the session key to the $K_{eNB}$ format comprises extracting a portion of the session key to be $K_{eNB}$, wherein the extracted portion has the predefined key length. In some cases, the session key is shorter than the predefined key length of the KeNB format, and mapping the session key to the KeNB format comprises padding the session key with additional bits to be KeNB, wherein the padded session key has the predefined key length. In some cases, converting the session key may involve inputting the session key into a key derivation function, KDF, such as a keyed-hash-message-authentication-code function using a secure hash algorithm (HMAC-SHA). In these cases, the session key may already have the length of an EPS AKA key (e.g., 256 bits), or may have a different length. Running the session key through the hash function (which may be a one-way function) to generate $K_{ASME}$ or $K_{eNB}$ may protect the original session key even if $K_{ASME}$ or $K_{eNB}$ becomes compromised.

In some cases, the core network node is an authentication server. Obtaining the session key may comprise generating the session key, wherein the session key is converted to $K_2$ (e.g., $K_{ASME}$), and wherein $K_2$ is sent to a MME node. As an example, $K_2$ is an access security management entity key, $K_{ASME}$, used in a EPS AKA procedure, and converting the session key comprises mapping the session key to a $K_{ASME}$ format. In some cases, the length of the session key may be different than $K_{ASME}$, and the conversion may involve padding the session key or removing bits from the session key to map the session key to the length of the $K_{ASME}$. This may be similar to the situation above in which the session key is converted to $K_{eNB}$. As discussed above, the session key may be converted to $K_2$ using a one-way hash function.

In step 1208, the core network node performs at least one of: i) sending $K_1$ to the base station and ii) sending $K_2$ to another core network node that is configured to derive $K_1$ from $K_2$. In some instances, $K_1$ and $K_2$ each has a length that is at least one of the following: i) equal to a length of an EPS AKA key (e.g., $K_{ASME}$, $Ke_{NB}$, $K_{RRCint}$, $K_{RRCenc}$, $K_{UPenc}$), and ii) different than a length of the session key. In some instances, K1, K2, or Kenc/int may be a key that has a same length and/or is used in the same way as an EPS AKA key. In step 1208, if the core network node sends $K_2$ to another core network node, the other core network node may be a MME node, and the core network node sending $K_2$ may be the authentication server.

In an embodiment, the step of identifying the non-USIM based authentication procedure comprises identifying, from among a plurality of network partitions, a network partition to which the WCD is attempting to connect, and determining that the network partition is associated with the non-USIM based authentication type. The WCD may, for example, explicitly indicate which network partition it is attempting to access. This determination may also be inferred from a device type (e.g., a low-power sensor versus a mobile broadband MBB device) or from the type of authentication data supplied by the WCD. A network partition that is assigned to MBB traffic may use EPS AKA, for example, while a network partition that is assigned to machine type communication (MTC) traffic may use a different AKA procedure.

In some situations, identifying the non-USIM based authentication procedure comprises determining that the core network node has received at least one of the following from the WCD: i) a user identifier and password, wherein the user identifier does not have an international mobile subscriber identity, IMSI, format and a password, and ii) a certificate (X.509 certificate).

In some situations, identifying the non-USIM based authentication procedure comprises receiving an indication of authentication type from the WCD, the indication associated with a non-USIM authentication procedure.

In some situations, identifying the non-USIM based authentication procedure comprises receiving subscription information associated with the WCD and accessing a database which associates subscription information with authentication procedure.

In some situations, identifying the non-USIM based authentication procedure comprises determining, from a device type of the WCD, that the WCD is not a mobile broadband (MBB) device.

In an embodiment method 1200 includes step 1210, in which the core network node obtains key generation data that is associated with the identified non-USIM based authentication procedure and that is for use in deriving the session key. In an embodiment, the method includes step 1212, in which the core network node sends the key generation data to the WCD. Private information may be required to generate the session key from the key generation data, so that the session key may remain secure even if the key generation data is intercepted during transmission.

Figure 13:
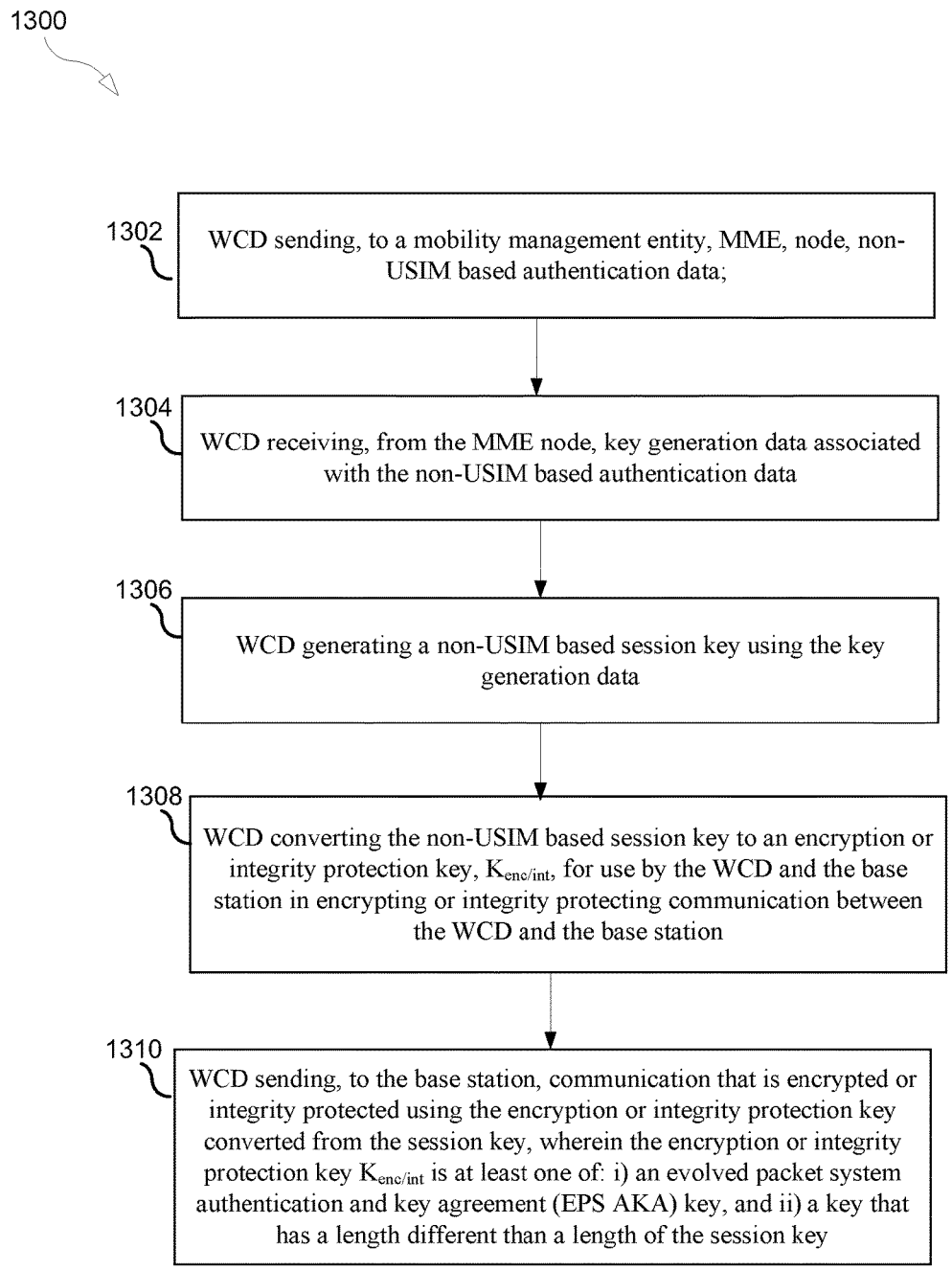

FIG. 13 illustrates an example method 1300 in a wireless communication device (WCD, such as an UE) for establishing encryption or integrity protection with a base station serving the WCD. In an embodiment, the method starts at step 1302, in which the WCD sends, to a mobility management entity, MME, node, non-USIM based authentication data. This data may be sent, e.g., as part of a NAS attach message or other network attach request message.

In step 1304, the WCD node may receive, from the MME node (generally indirectly, through the eNB), key generation data associated with the non-USIM based authentication data. In one example, this data may be part of an NAS Auth Request message. In EPS AKA, a core network may include the RAND and AUTN in the NAS Auth Request message. For step 1304, the core network node may have generated, e.g., key generation data with the same format as the combination of RAND and AUTN, and inserted the key generation data in the NAS Auth Request message. It may include, e.g., an index or an input value to a key derivation function. In an embodiment, the key generation data comprises an identification of a type of authentication procedure between i) the WCD and the MME node or ii) the WCD and an authentication server to which the MME node is connected. In an embodiment, the non-USIM based authentication data comprises at least one of: i) user identifier and password, wherein the user identifier does not have an IMSI format, and ii) a certificate.

In step 1306, the WCD generates a non-USIM based session key using the key generation data. In an embodiment, this session key may have a different format than a key used in EPS AKA.

In step 1308, the WCD may convert the non-USIM based session key to an encryption or integrity protection key, $K_{enc/int}$, for use by the WCD and the base station in encrypting or integrity protecting communication between the WCD and the base station. This conversion may involve mapping the session key directly to $K_{enc/int}$, or may involve converting the session key to an intermediate key such as $K_{ASME}$ and/or $K_{eNB}$, and from the intermediate key to $K_{enc/int}$. The conversion may be performed according to, e.g., the mapping or KDFs discussed above. As an example, the converting may comprise i) converting the session key to a first key, $K_1$, for use by the WCD and the base station to derive $K_{enc/int}$; ii) converting $K_1$ to $K_{enc/int}$ by inputting $K_1$ and an algorithm distinguisher value into a key derivation function, KDF, wherein the KDF is a hash function, and wherein the algorithm distinguisher value (e.g., a scalar value) distinguishes between whether the output of the KDF is being used to perform encryption or integrity protection, and distinguishes between whether the output of the KDF is being used for radio resource control, RRC, signaling or for user plane, UP, signaling. In this example, converting the session key to $K_1$ may comprise converting the session key to a second key $K_2$, and converting $K_2$ to $K_1$ by inputting K2 into the KDF.

In step 1310, the WCD may send, to the base station, communication that is encrypted or integrity protected using the encryption or integrity protection key converted from the session key. The encryption or integrity protection key $K_{enc/int}$ has a length that is at least one of: i) equal to a length of an evolved packet system authentication and key agreement (EPS AKA) key, and ii) different than a length of the session key.

In an embodiment, method 1300 may further include sending at least one of: i) a identifier of a network partition the WCD is attempting to access, ii) an identifier of an authentication procedure to be used for authenticating the WCD, iii) a device type of the WCD, and iv) subscription information associated with the WCD.

As discussed above, an authentication and key agreement (AKA) procedure different than EPS AKA may be used. This AKA procedure may be used with USIM-based authentication data or may be used with non-USIM-based authentication data. This may involve, for example, identification of WCDs using different authentication and key agreement (AKA) mechanisms, or identifying which UEs should use a different authentication mechanism than EPS AKA. This can be done using different techniques.

Figure 16:
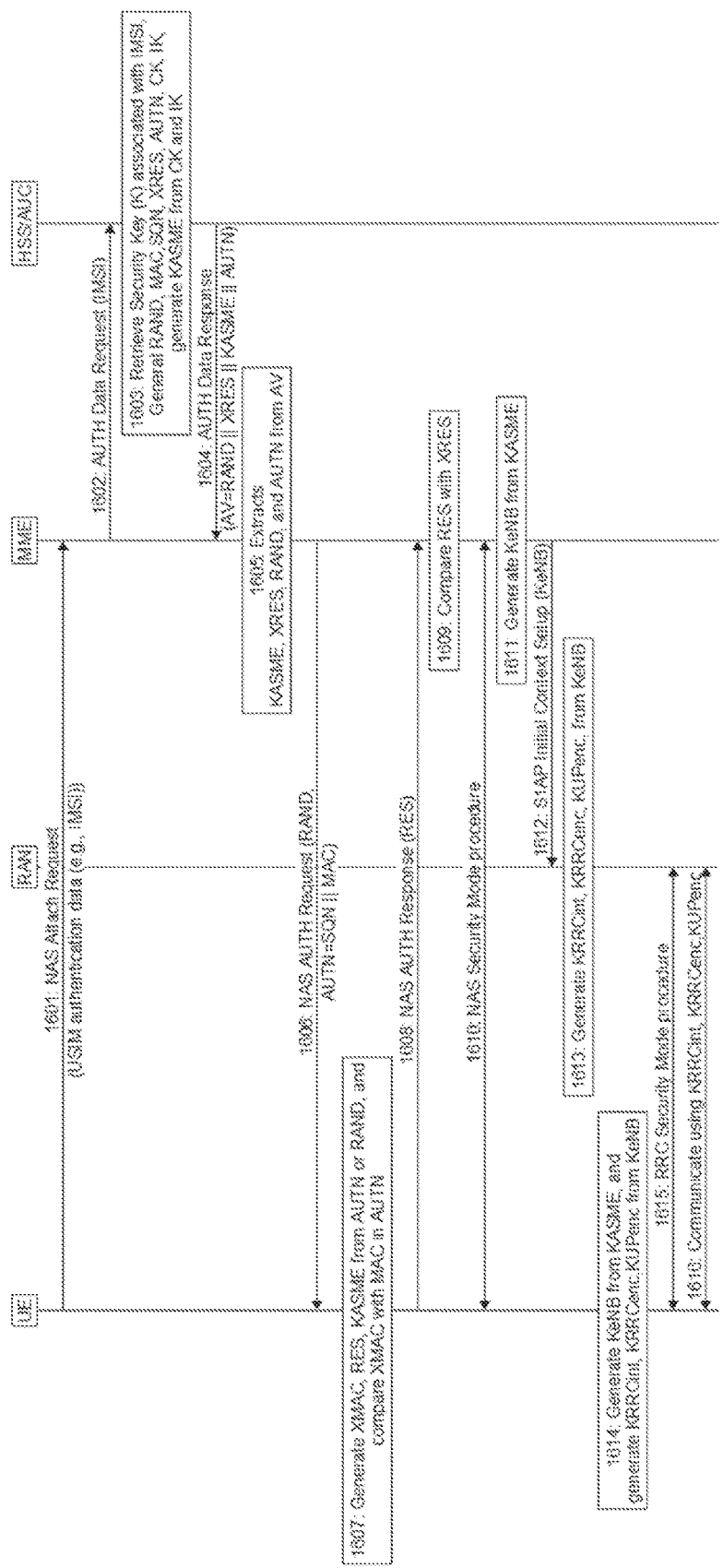
FIG. 16 is an illustration of example signaling in a version of EPS AKA.

The signaling diagram in FIG. 16 illustrates a version of signaling for EPS AKA. Example features of EPS AKA may include some or all of the following: comparing a RES to a XRES value, comparing a MAC to a XMAC value, and a key agreement procedure.

Comparison of RES and XRES may include the following:
 a home subscriber server, HSS, receiving USIM-based authentication data from the WCD,
 the HSS obtaining a predetermined key, K, associated with the USIM-based authentication data,
 the HSS generating an expected response value, XRES, based on K and transmitting XRES and MAC to a mobile management entity, MME node,
 the MME node receiving a response value, RES, from the WCD, wherein RES is based on a stored key stored in the WCD that is the same predetermined key K or a different predetermined key,
 the MME node determining whether XRES matches RES,
Comparison of XMAC and MAC may include following:
 the WCD generating an expected message authentication code, XMAC, based on the key stored in the WCD,
 the WCD receiving a message authentication code, MAC, from the HSS, the MAC based on the predetermined key obtained by the HSS (the MAC may be extracted from an authentication token AUTN),
 the WCD determining whether MAC matches XMAC
Key agreement procedure may include the following:
 the HSS generating a random number, RAND, and authentication token, AUTN;
 the HSS generating an intermediate key, KASME, based on K, RAND, and AUTN, and transmitting KASME, RAND, and AUTN to the MME node,
 the MME node transmitting RAND and AUTN, and not KASME, to the WCD, and
 the WCD generating KASME based on the received RAND, AUTN, and the predetermined key stored in the WCD
 the MME node generating a key, KeNB, for encryption or integrity protection between the WCD and the eNB, the generating based on the KASME generated by the MME node,
 the MME node transmitting KeNB to the eNB,
 the WCD generating KeNB based on the KASME generated by the WCD, and
 the generation (e.g., derivation) of keys being based on the HMAC-SHA-256 function.

In an embodiment, indication of which AKA procedure to use can be stored in the subscription information of the UE, or hard coded for a specific UE type or network, or network partition the UE connects to.

In an embodiment, the method to be used can be indicated by the UE, e.g. based on explicit indication or derived from hard coded rules based on some other information (e.g. UE identity, UE type, UE capabilities). In this case the indication can either first be requested from the MME to the UE, or the UE is programmed to always send up this indication when connecting to network that supports this feature.

Figure 14:
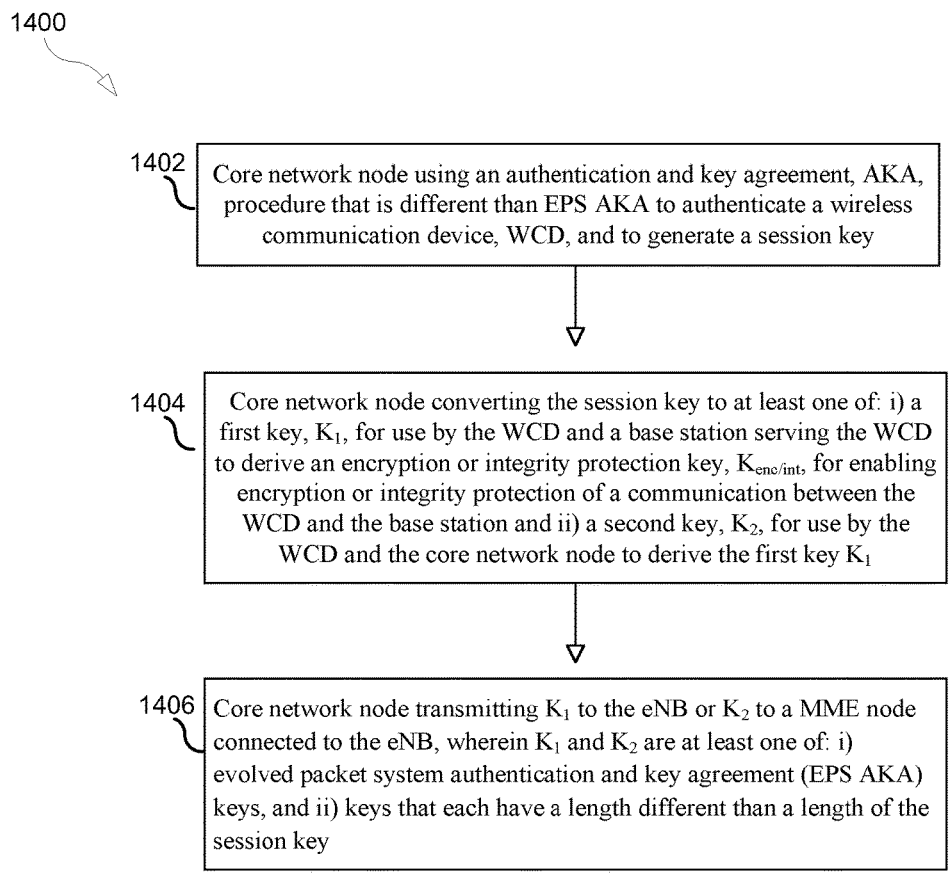

As an example, FIG. 14 illustrates an example method 1400 in a core network node for establishing encryption or integrity protection. In an embodiment, method 1400 begins at step 1402, in which the core network node uses an authentication and key agreement, AKA, procedure (e.g., EAP-TLS) that is different than EPS AKA to authenticate a wireless communication device, WCD, and to generate a session key.

In step 1404, the core network node converts the session key to at least one of: i) a first key, $K_1$, for use by the WCD and a base station serving the WCD to derive an encryption or integrity protection key, $K_{enc/int}$, for enabling encryption or integrity protection of a communication between the WCD and the base station and ii) a second key, $K_2$, for use by the WCD and the core network node to derive the first key $K_1$.

In step 1406, the core network node transmits $K_1$ to the eNB or $K_2$ to a MME node connected to the eNB. In an embodiment, $K_1$ and $K_2$ each has a length that is at least one of: i) equal to a length of an evolved packet system authentication and key agreement (EPS AKA) key, and ii) different than a length of the session key.

In an embodiment, the core network node may receive a message from a WCD for accessing a core network in which the core network node is located. It may determine, based on information in the message, whether an authentication and key agreement, AKA, procedure that is different than evolved packet system AKA (EPS AKA) should be performed for authenticating the WCD, wherein converting the session key is performed in response to determining that the AKA procedure is different than EPS AKA.

In an embodiment, using the AKA procedure that is different than EPS AKA to authenticate the WCD comprises the core network node receiving non-USIM authentication data that is at least one of: i) a user identifier and password, wherein the user identifier does not have an IMSI format and ii) a certificate.

In an embodiment, using the AKA procedure that is different than EPS AKA to authenticate the WCD comprises not performing all of the following: i) the core network node obtaining an expected response value, XRES, based on a predetermined key, K, associated with USIM-based authentication data received from the WCD, ii) the core network node receiving a response value, RES, from the WCD, wherein RES is based on a key stored in the WCD that is the same predetermined key K or a different predetermined key, and iii) the core network node comparing RES with XRES.

In an embodiment, using the AKA procedure that is different than EPS AKA to obtain an encryption or integrity protection key comprises converting the session key directly to $K_1$, without converting the session key to $K_2$, wherein $K_1$ is the $K_{eNB}$ key used in the EPS AKA procedure and $K_2$ is the access security management entity key, $K_{ASME}$, used in the EPS AKA procedure.

Figure 15:
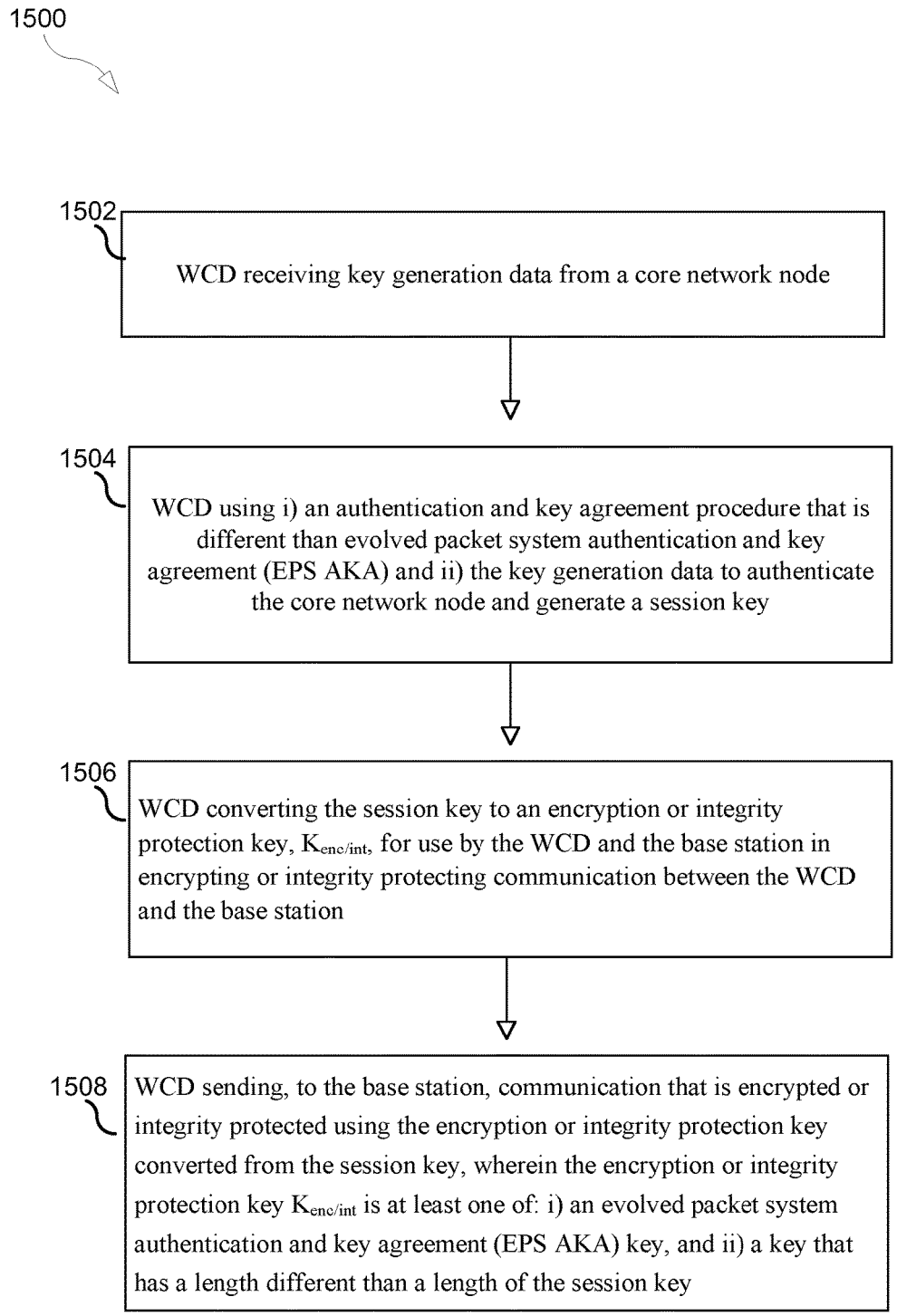

FIG. 15 illustrates an example method 1500 in a WCD for establishing encryption or integrity protection. In an embodiment, method 1500 may begin at step 1502, in which the WCD receives key generation data from a core network node.

In step 1504, the WCD uses i) an authentication and key agreement procedure that is different than evolved packet system authentication and key agreement (EPS AKA) and ii) the key generation data to authenticate the core network node and generate a session key.

In step 1506, the WCD converts the session key to an encryption or integrity protection key, $K_{enc/int}$, for use by the WCD and the base station in encrypting or integrity protecting communication between the WCD and the base station.

In step 1508, the WCD sends, to the base station, communication that is encrypted or integrity protected using the encryption or integrity protection key converted from the session key. In an embodiment, the encryption or integrity protection key $K_{enc/int}$ has a length that is at least one of: i) equal to a length of an evolved packet system authentication and key agreement (EPS AKA) key, and ii) different than a length of the session key.

In an embodiment, using the AKA procedure that is different than EPS AKA to authenticate the core network node comprises not performing all of the following: i) the WCD obtaining an expected message authentication code, XMAC, based on a predetermined key, K, stored in the WCD, ii) the WCD receiving a message authentication code, MAC, from the core network node, wherein the MAC is based on a key obtained by the core network node that is the same predetermined key K or a different predetermined key, and iii) the WCD comparing MAC with XMAC.

In an embodiment, using the AKA procedure that is different than EPS AKA to obtain an encryption or integrity protection key comprises converting the session key directly to a first key, $K_1$, without converting the session key to $K_2$, wherein $K_1$ is the $K_{eNB}$ key used in the EPS AKA procedure and $K_2$ is the access security management entity key, $K_{ASME}$, used in the EPS AKA procedure.

Changes to Authentication Signaling:

Once it is determined which authentication mechanism that the UE should use, the network or UE can initiate the authentication procedure (signaling). The authentication signaling will typically be transferred as part of the NAS layer. Two sub-scenarios can be considered.

Figure 18:
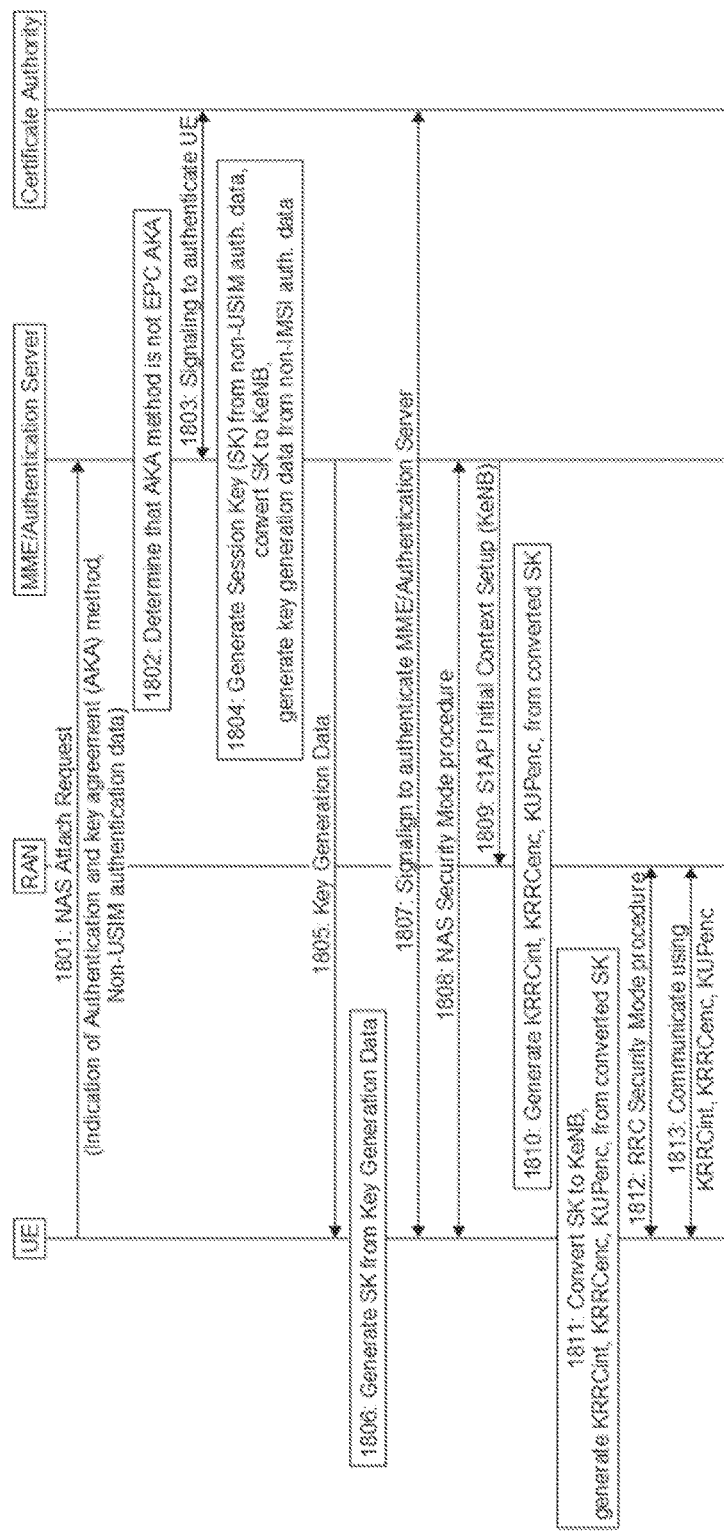

In the first sub-scenario, the MME is aware of that new AKA (an AKA different than EPS AKA) is used. In this case the NAS procedures can be modified so that it can incorporate new AKA messages exchanged between UE and MME and possible towards HSS or AAA infra-structure. In order to do this some optional indication may be carried in the NAS messages between UE and MME indicating that different AKA is used (possible also which AKA is used). In some cases, the MME node may convert the session key directly to KeNB, without converting the session key to $K_{ASME}$. There may, however, be some benefits to not converting the SK directly to KeNB, but instead create a KASME in between. More specifically, the existing mechanism from LTE can be used where the KeNB is generated, fresh at every Idle to Active state transition, from the $K_{ASME}$, which is not transmitted from MME node to the eNB (i.e., it does not leave MME). This may enhance security. Further, in instances where the session key is converted directly to KeNB, the conversion may allow the same KeNB to be generated for the same session key, or may allow fresh KeNBs to be generated for the same session key. For the latter case, the session key may be modified (e.g., concatenated with a random value), before the modified session key is converted to KeNB. FIG. 18 illustrates signaling in an example situation in which the MME node (which may be combined with an authentication server into one node) is aware that non USIM-based authentication is being used.

Figure 17:
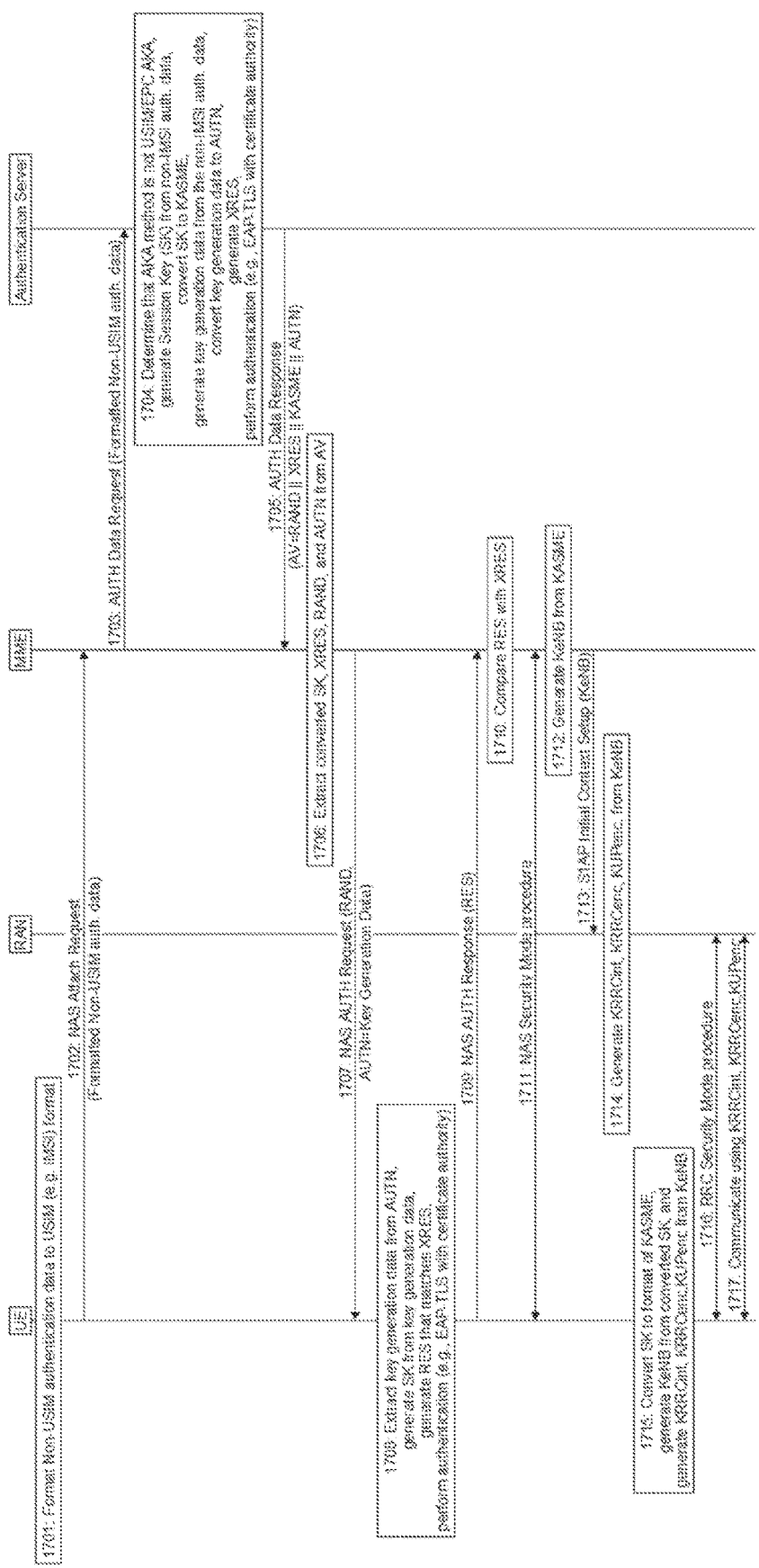
FIGS. 17 and 18 are illustrations of example signaling in AKA that is different than EPS AKA.

In the second sub-scenario, the MME is unaware of that new AKA or new credentials is used. In this case the MME will as in legacy receive an Authentication vector. FIG. 17 illustrates example signaling for this situation. The session keys as well as the XRES in these vector are derived from a different AKA or credentials in the UE and HSS/AuC, but the MME behavior and NAS signaling is not modified. For instance, the MME node still sends the RAND, AUTN to the UE, which calculates session keys, and RES using different credentials and/or algorithm than in EPS AKA. The RES is then send to the MME node to compared with the XRES which completes the AKA.

The example embodiments herein support any new authentication and key agreement procedure (e.g. EAP based) using any credentials (e.g., user name and/or password, X.509) assuming that they at least generate some session keys (SK), with an acceptable level of security (including key length). These session keys are then converted according to a predefined conversion function in the UE and in the network. The keys can be converted to the CK, IK or directly to $K_{ASME}$, or even directly to $K_{eNB}$.

In instances where the session key is converted directly to $K_{eNB}$, the conversion may always convert a particular session key value to the same $K_{eNB}$ value, or may cause the particular session key value to be converted to a different (e.g., fresh) $K_{eNB}$ values. For example, the conversion may concatenate the session key with a random value that changes between different conversions. This concatenation modifies the session key value, so that the same session key can be used to generate different $K_{eNB}$ values.

Possible conversion methods from the session key to $K_{ASME}$ include the following:
  Assigning X bits of the SK to correspond to X bits of $K_{ASME}$. In the case $K_{ASME}$ is larger than SK, $K_{ASME}$ can be padded with 0s or any other pattern.
  Running SK through any specific Key Derivation Function to create $K_{ASME}$.

A conversion from the session key directly to $K_{eNB}$ may use a similar bit assignment, padding, or KDF approach as above.

Once SK has been converted to a key used in E-UTRAN/EPC, the existing behavior of E-UTRAN/EPC is kept, making it possible to support existing E-UTRAN encryption and integrity protection functions without using USIM based AKA. This means that depending on the sub-solution the only nodes needed to be modified to support this is the UE and HSS which converts from SK to CK, IK or to $K_{ASME}$.

In some cases it might also be desirable to use different key handling in the MME, in this case the MME might be modified to support the new AKA mechanism and also to support the conversion of SK to $K_{eNB}$ (and possible NH). In this case the eNB would not be modified and use the $K_{eNB}$ (and NH) as normal.

As discussed above, aspects of using non USIM-based authentication or non EPS AKA may be combined with network partitioning. The use of new AKA and credentials fits very nicely into the concept of network partitioning. Several mechanisms can be considered: Since network partitioning provides a level of isolation between different network partitions, it is possible to have different legal owners to different partitions. These different legal owners might want to use different AKA or credentials, which this disclosure allows, and which network partitioning supports since access to one partition does not provide access to other partitions.

In some cases, different partitions might be associated with different security levels requiring different AKA or credentials, which this disclosure allows, and which network partitioning supports since access to one partition does not provide access to other partitions.

When using network partitioning it is possible to use the indication of which network partition the UE is or should be connected to as an indication to which AKA or credential should be used as enabled by the disclosure. E.g. all UEs accessing partition A should use AKA mechanism A, while UEs accessing partition B should use AKA mechanism B.

Network partitioning can be used to support the embodiments herein without impacting existing nodes and services. New AKA or credentials may be only used in new network partitions, while existing network partitions continue to use USIM based AKA.

Additional aspects of network partitioning:
  In an embodiment, a Network Partition is a (logical) partition of the network, used e.g. for resource allocation, isolation, operational efficiencies, optimization, business relevance or to improve TTM/TTC.
  In an embodiment, a plurality of network partitions include a Base Partition that is the first network partition that the UE connects to and is responsible for authenticating the UE towards the network. Different UEs could be associated with different Base Partitions.
  In an embodiment, a Resource instance is a physical or virtual resource used as a building block for network partitions, which can be dedicated or shared amongst network partitions.

The motivation for supporting network partitioning could include:
  Optimizing use of resources which are separately configurable
  Opening up for a "toolbox" architecture instead of "one size fits all"
  TTM—faster setup if separately managed and limited impact on other partitions
  Potential for allowing enterprises or other verticals to impact/configure/monitor their partition, given proper isolation
  Allowing for smooth migration, by enabling new service in new partitions, while still maintaining and evolving existing services in existing partitions
  Allowing for re-use of functionality developed for one use case and once partition for other use cases/partitions, while still allowing for isolation, individual configurability. Example of this could include using same security or mobility mechanisms.

In some cases, deploying several partitions of an EPC network makes it possible to support a common RAN solution for several different partitions.

There are several potential purposes to support network portioning. The operator can for instance support a default partition handling the most common use case such as mobile broadband (MBB) and then use network partitioning to support cases where:
  There is a need to optimize or support a specific capability such as short latency (RTT), high reliability, additional functionality (e.g. non-SIM based security)
  The operator want to provide an "as a Service (aaS)" offering e.g. network as a service provide to 3rd parties, network services aaS (e.g. Voice over LTE)

The operator want to isolate some traffic from default partition e.g. for trial services for a limited set of trial users, SW upgrade, security isolation of know insecure devices.

Network partitioning may be supported by the following high level mechanisms:

A common base architecture supported for all partitions of the network. This could for instance include a common RAN architecture and RAN interface (radio, S1 interface).

Common mechanisms for partition selection. This could include mechanism on how the UE is assigned to a specific partition at initial connection.

With the concept of network partitioning it is possible to support the following in the same infrastructure:

MBB services using a default network partition, and then support a large number of MTC devices such as sensors/actuators in a separate partition, which for instance is optimized to handle a large number of devices associated with low bit-rate services.

Similarly it is possible to handle critical MTC communication e.g. for self-driving cars, in a separate partition potentially optimized for low latency and high availability services. This partition might for instance deploy packet core functions closer to the radio node to minimize the latency.

In principle the network partitioning concept can support any combination of the following use cases:

Mobile Broadband (MBB):
  "Normal MBB"
  Extreme Mobile Broadband
  Distributed MBB
  MBB incl. Wi-Fi Calling (untrusted (S2b) access)
  Wi-Fi included in MBB (untrusted (S2b) access)
  Wi-Fi included in MBB (trusted (S2a) access)
  Broadband access for user in a crowd
  Mobile broadband in vehicles Massive MTC:
  M2M Basic
  Massive low-cost/long-range/low-power MTC Mission Critical MTC:
  Ultra high reliability, and/or ultra low latency
  Industry Automation
  Traffic Safety/Control (ITS)

Efficient Media Distribution

Partitions/sub-partitions aaS
  VoLTE aaS
  MTC aaS (Massive or Mission Critical)
  Virtual Enterprise/Enterprise services
  MVNO aaS (FFS).

Operational Use Cases (e.g. SW upgrade, trial of new feature):

The interface between the RAN and CN can be common for all partitions and can be based on the S1 interface between E-UTRAN and EPC.

One Base Partition can connect to more than one RAN, thus providing RAN mobility functionality inside the Base Partition One RAN can connect to more than one Base Partition Base Partition Selection is assumed to be performed seldom, typically at first Attach/power-on It shall be possible to verify the Base Partition selected for the UE through subscription data Network partitioning concept should be applicable for any cellular access (2G/3G/4G/5G etc. and for Wi-Fi.

When a UE attaches to a network, the Base Partition selection can select the same partition irrespective of which RAN the UE is using It is not required that a UE can move between partitions without re-attaching A default partition seems needed to handle for example:
Legacy UE not supporting sending new identifiers for partitioning Roaming UE requesting a non-supported type of partition The network partitioning concept is primarily intended for virtualized environment, but should also support non-virtualized environments.

With the concept of network partitioning, it is possible to support, for example, MBB services using a default network partition, and then support a large number of MTC devices such as sensors/actuators in a separate partition, which for instance is optimized to handle a large number of devices associated with low bit-rate services. Similarly, it is possible to handle critical MTC communication, e.g. for self-driving cars, in a separate partition potentially optimized for low latency and high availability services. This partition might for instance deploy packet core functions closer to the radio node to minimize the latency.

While some of the above examples relate to E-UTRAN, it should be appreciated that all of the example embodiments presented herein may be applicable to a GERAN, UTRAN or E-UTRAN based system.

Example Node Configurations

Figure 19:
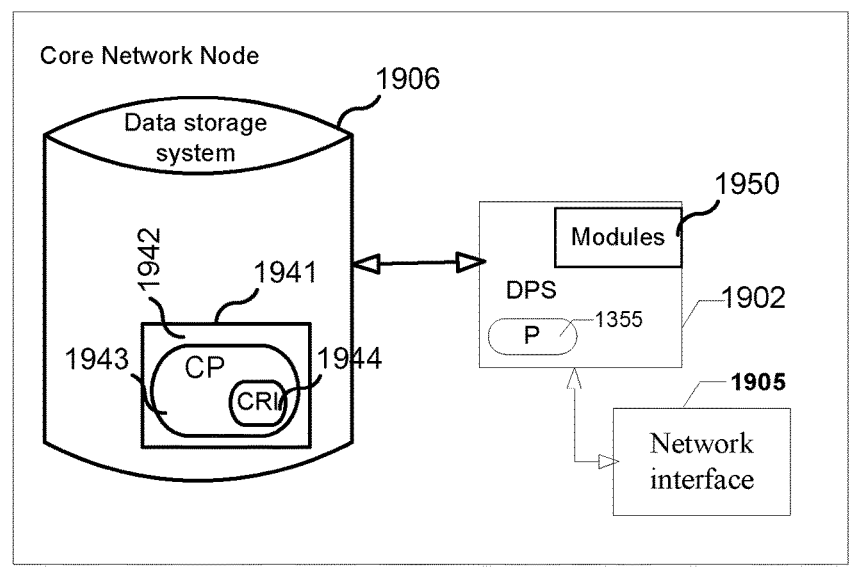
FIGS. 19-21 illustrate example components of a core network node, according to an aspect of the present disclosure.
Figure 20:
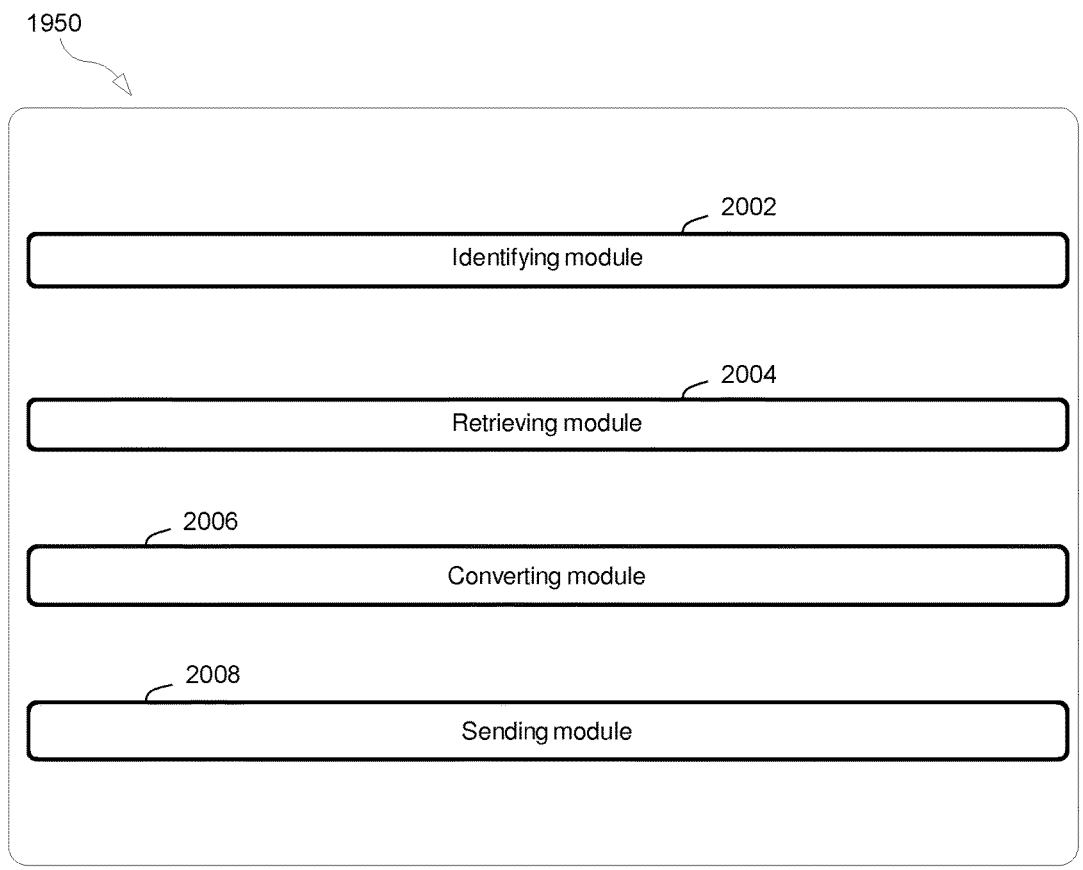
Figure 21:
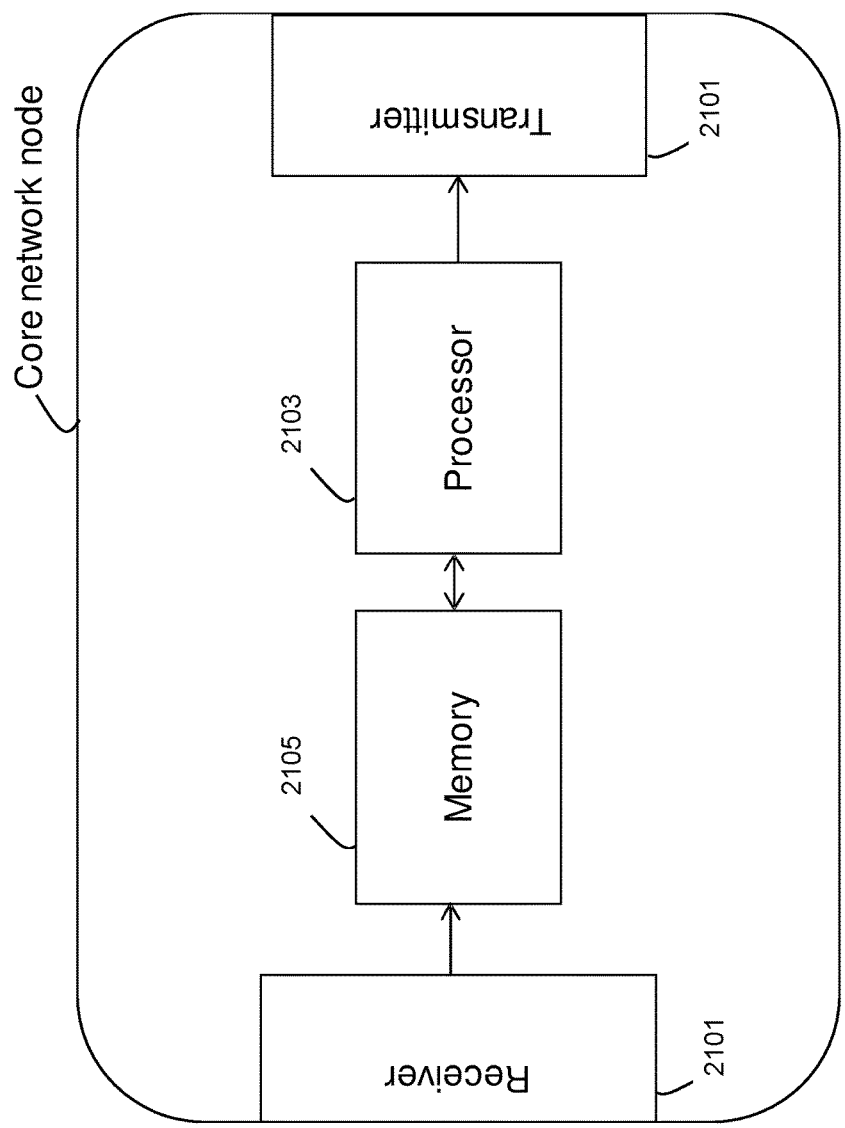

FIGS. 19-21 illustrate an example node configuration of a core network node. FIG. 19 is a block diagram of an embodiment of a core network node. As shown in FIG. 19, the network node may include: a computer system (CS) 1902, which may include one or more processors 1955 (e.g., a general purpose microprocessor and/or one or more other data processing circuits, such as an application specific integrated circuit (ASIC), field-programmable gate arrays (FPGAs), and the like); a network interface 1905 for use in connecting the network node to other network elements and communicating with other units connected to the network; and a data storage system 1906 for storing information (e.g., network slice information received from network management node (e.g., NM or DM), which may include one or more non-volatile storage devices and/or one or more volatile storage devices (e.g., random access memory (RAM)). In embodiments where computer system 1902 includes a general purpose microprocessor, a computer program product (CPP) 1941 may be provided. CPP 1941 includes a non-transitory computer readable medium (CRM) 1942 storing a computer program (CP) 1943 comprising computer readable instructions (CRI) 1944. CRM 1942 may be a non-transitory computer readable medium (i.e., magnetic media (e.g., a hard disk), optical media (e.g., a DVD), flash memory, and the like). In some embodiments, the CRI 1344 of computer program 1943 is configured such that when executed by data processing system 1902, the CRI causes the computer system to perform steps described herein. In other embodiments, computer system 1902 may consist merely of one or more ASICs. Hence, the features of the embodiments described herein may be implemented in hardware and/or software. The DPS 1902 may be configured to execute one or more modules 1950.

FIG. 20 illustrates example modules 1950 that can be executed on DPS 1902. These modules include an identifying module 2002, a retrieving module 2004, a converting module 2006, and a sending module 2008.

It should be appreciated that the core network node may be a MME node or an authentication server, for example, an AAA or AuC. The core network node may also be any other node in the network which has access to authentication and/or encryption based information. The core network node may assist in establishing encrypted communications according to the example embodiments described herein. FIG. 21 illustrates another version of a core network node. This version of the core network node may comprise a receiver 2101 that may be configured to receive communication data, instructions, and/or messages. The core network node may also comprise a transmitter 2102 that may be configured to transmit communication data, instructions and/or messages. It should be appreciated that the receiver 2101 and transmitter 2102 may be comprised as any number of transceiving, receiving, and/or transmitting units, modules or circuitry. It should further be appreciated that the receiver 2101 and transmitter 2102 may be in the form of any input or output communications port known in the art. The receiver 2101 and transmitter 2102 may comprise RF circuitry and baseband processing circuitry.

The core network node may also comprise a processing unit or circuitry 2103 which may be configured to establish encryption as described herein. The processing circuitry 2103 may be any suitable type of computation unit, for example, a microprocessor, digital signal processor (DSP), field programmable gate array (FPGA), or application specific integrated circuit (ASIC), or any other form of circuitry or module. The core network node may further comprise a memory unit or circuitry 2105 which may be any suitable type of computer readable memory and may be of volatile and/or non-volatile type. The memory 2105 may be configured to store received, transmitted, and/or measured data, device parameters, communication priorities, and/or executable program instructions.

Figure 22:
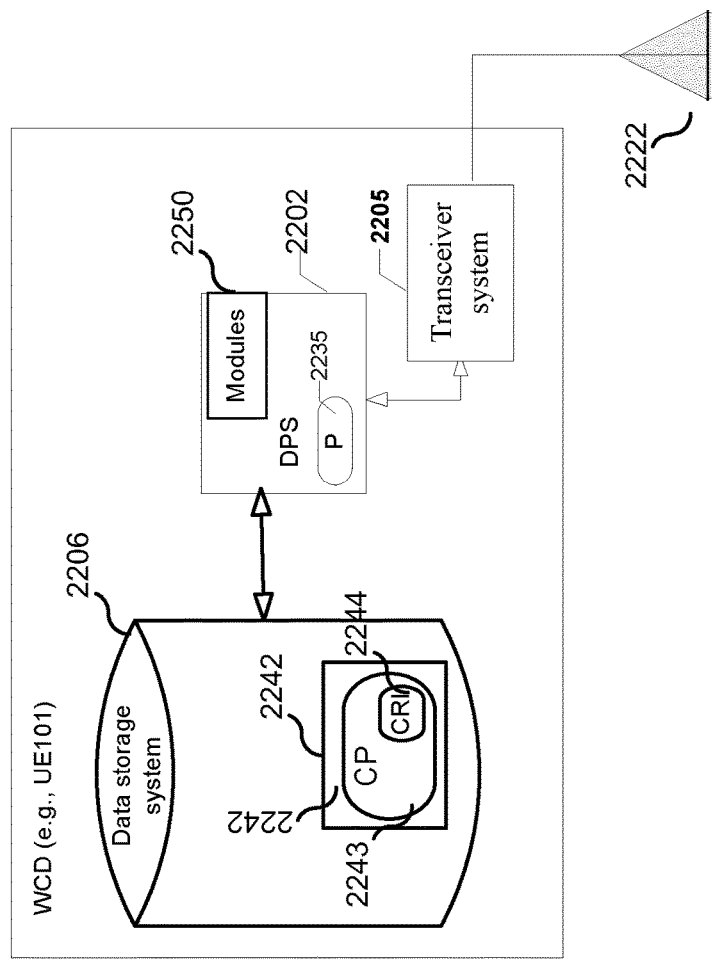
FIGS. 22-24 illustrate example components of a core network node, according to an aspect of the present disclosure.
Figure 23:
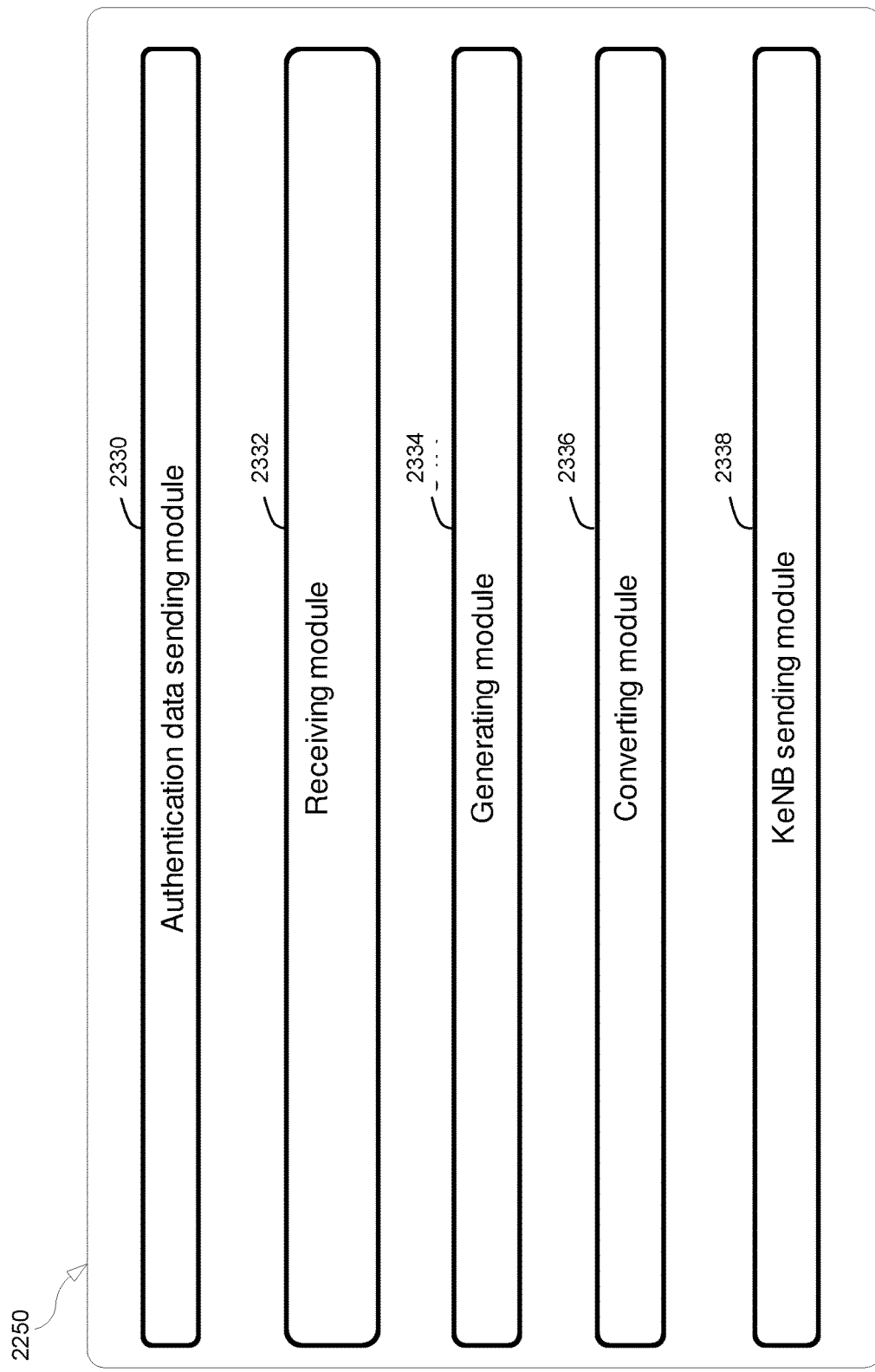
Figure 24:
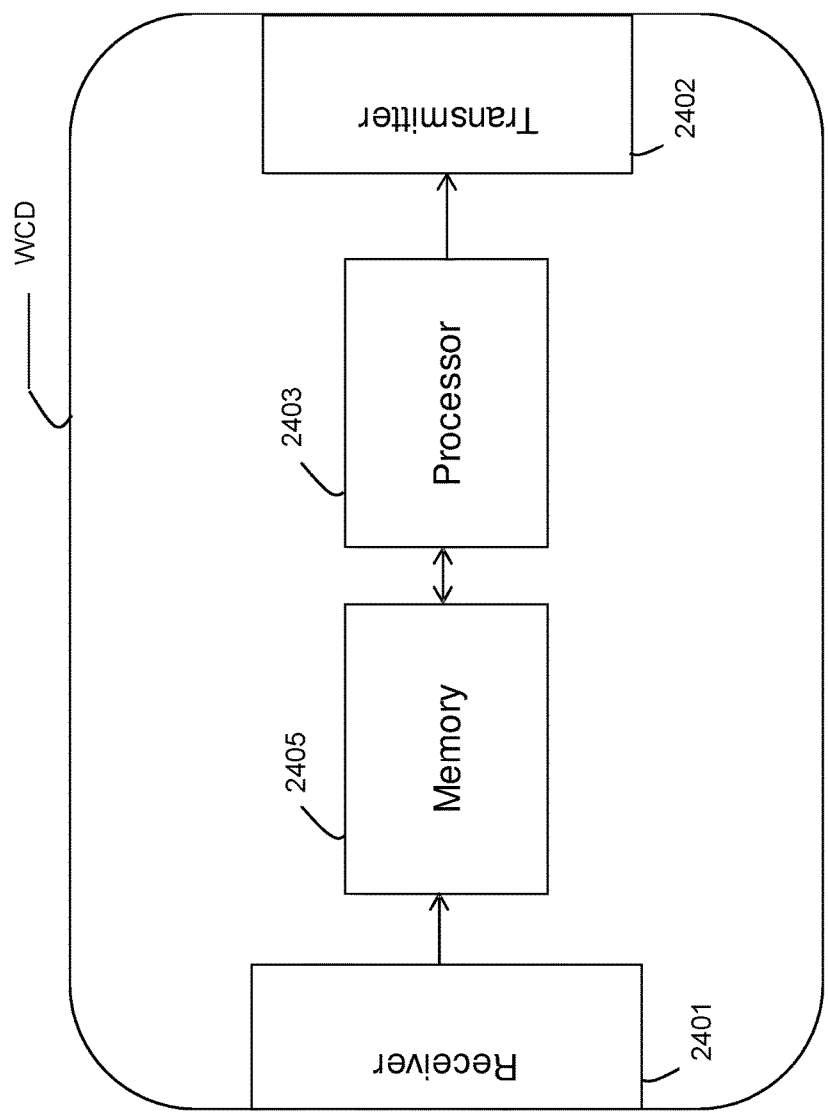

FIGS. 22-24 illustrate example components of a WCD.

FIG. 22 is a block diagram of an embodiment of a core network node. As shown in FIG. 22, the network node may include: a computer system (CS) 2202, which may include one or more processors 2255 (e.g., a general purpose microprocessor and/or one or more other data processing circuits, such as an application specific integrated circuit (ASIC), field-programmable gate arrays (FPGAs), and the like); a transceiver system 2205 and antenna 2222 for use in communicating with a base station; and a data storage system 2206 for storing information (e.g., network slice information received from network management node (e.g., NM or DM), which may include one or more non-volatile storage devices and/or one or more volatile storage devices (e.g., random access memory (RAM)). In embodiments where computer system 2202 includes a general purpose microprocessor, a computer program product (CPP) 2241 may be provided. CPP 2241 includes a non-transitory computer readable medium (CRM) 2242 storing a computer program (CP) 2243 comprising computer readable instructions (CRI) 2244. CRM 2242 may be a non-transitory computer readable medium (i.e., magnetic media (e.g., a hard disk), optical media (e.g., a DVD), flash memory, and the like). In some embodiments, the CRI 2244 of computer program 2243 is configured such that when executed by data processing system 2202, the CRI causes the computer system to perform steps described herein. In other embodiments, computer system 2202 may consist merely of one or more ASICs. Hence, the features of the embodiments described herein may be implemented in hardware and/or software. The DPS 2202 may be configured to execute one or more modules 2250.

FIG. 23 illustrates the modules 2250 that may be implemented in DPS 2202. These include an authentication data sending module 2330, a receiving module 2332, a generating module 2334, a converting module 2336, and a KeNB sending module 2338.

The WCD may assist in providing encryption according to the example embodiments described herein.

FIG. 24 illustrates another example of a WCD. The WCD may comprise a receiver 2401 that may be configured to receive communication data, instructions, and/or messages. The SGW/SGSN may also comprise a transmitter 2402 that may be configured to transmit communication data, instructions and/or messages. It should be appreciated that the receiver 2401 and transmitter 2402 may be comprised as any number of transceiving, receiving, and/or transmitting units, modules or circuitry. It should further be appreciated that the receiver 2401 and transmitter 2402 may be in the form of any input or output communications port known in the art. The receiver 2401 and transmitter 2402 may comprise RF circuitry and baseband processing circuitry.

The wireless communication device may also comprise a processing unit or circuitry 2403 which may be configured to provide encryption as described herein. The processing circuitry 2403 may be any suitable type of computation unit, for example, a microprocessor, digital signal processor (DSP), field programmable gate array (FPGA), or application specific integrated circuit (ASIC), or any other form of circuitry or module. The wireless device may further comprise a memory unit or circuitry 2405 which may be any suitable type of computer readable memory and may be of volatile and/or non-volatile type. The memory 2405 may be configured to store received, transmitted, and/or measured data, device parameters, communication priorities, and/or executable program instructions.

Figure 25:
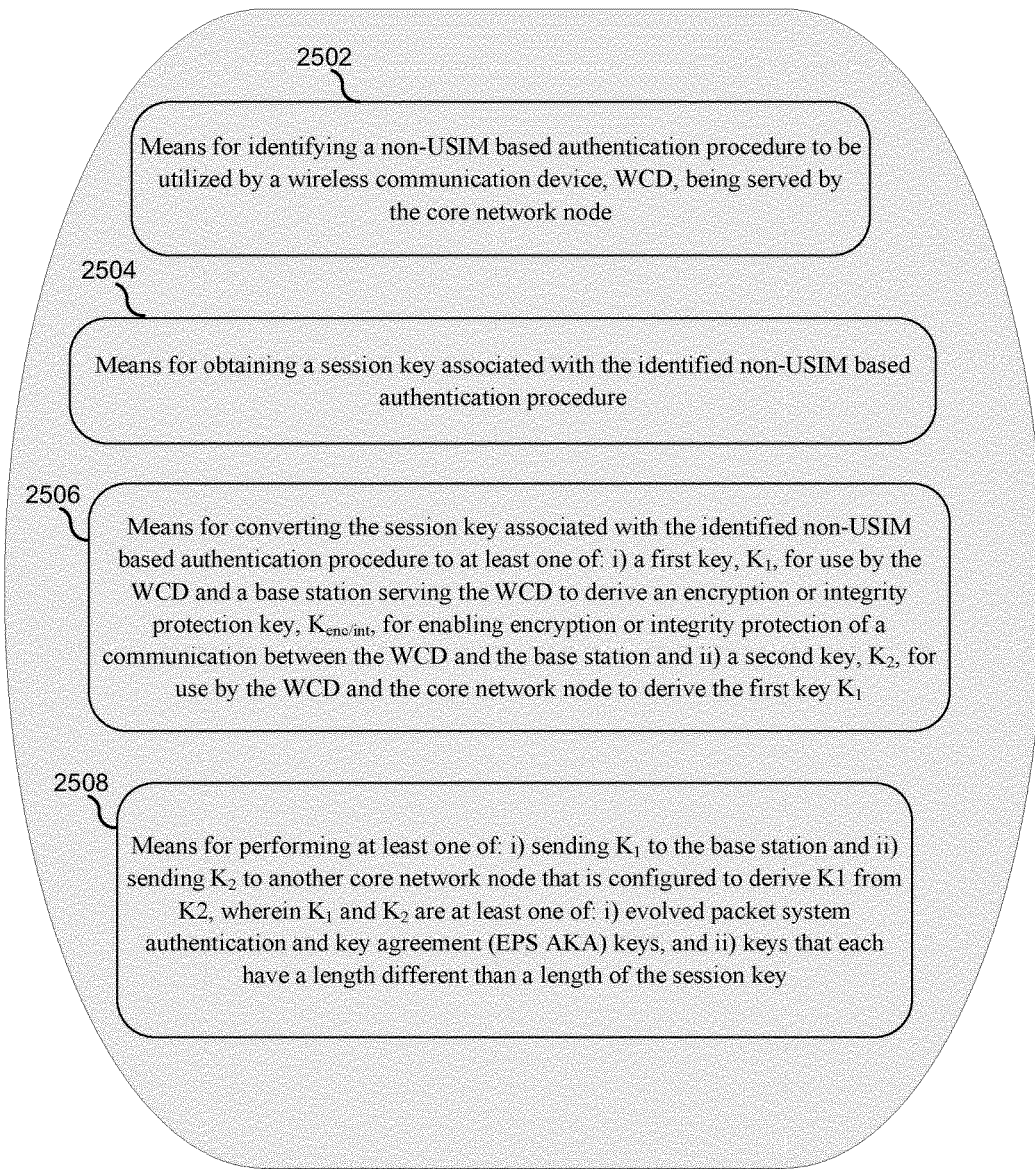
FIG. 25 illustrate example components of a core network node, according to an aspect of the present disclosure.
Figure 26:
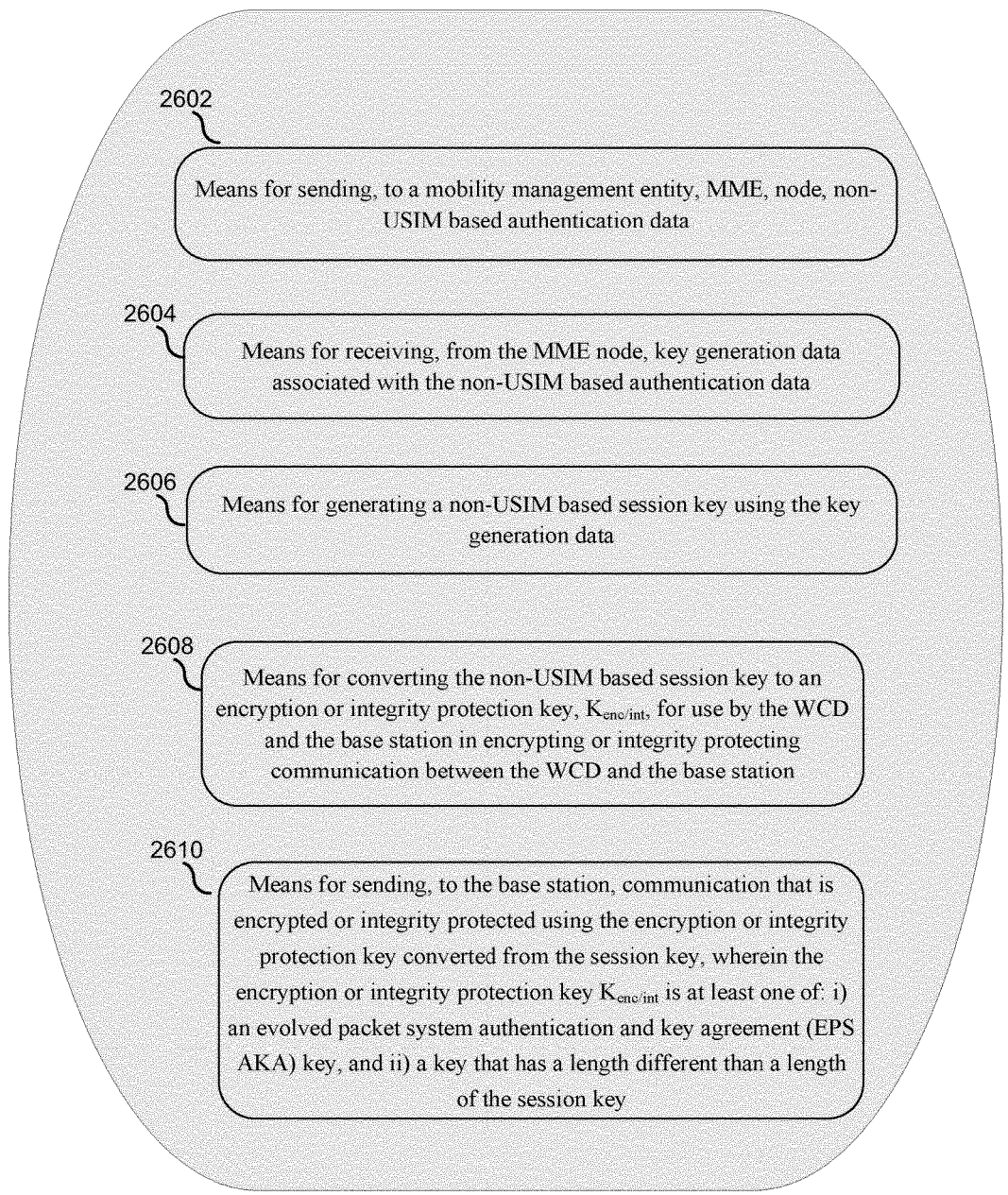
FIG. 26 illustrate example components of a WCD, according to an aspect of the present disclosure.

FIG. 25 illustrates example components of a core network node. These include: means for identifying 2502 a non-USIM based authentication procedure to be utilized by a wireless communication device, WCD, being served by the core network node; means for identifying 2504 a non-USIM based authentication procedure to be utilized by a wireless communication device, WCD, being served by the core network node; means for converting 2506 the session key associated with the identified non-USIM based authentication procedure to at least one of: i) a first key, $K_1$, for use by the WCD and a base station serving the WCD to derive an encryption or integrity protection key, $K_{enc/int}$, for enabling encryption or integrity protection of a communication between the WCD and the base station and ii) a second key, $K_2$, for use by the WCD and the core network node to derive the first key K1; means for performing 2508 at least one of: i) sending $K_1$ to the base station and ii) sending $K_2$ to another core network node that is configured to derive K1 from K2, wherein $K_1$ and $K_2$ are at least one of: i) evolved packet system authentication and key agreement (EPS AKA) keys, and ii) keys that each have a length different than a length of the session key FIG. 26 illustrates example components of a WCD. These include: means for sending 2602, to a mobility management entity, MME, node, non-USIM based authentication data; means for receiving 2604, from the MME node, key generation data associated with the non-USIM based authentication data; means for generating 2606 a non-USIM based session key using the key generation data; means for converting 2608 the non-USIM based session key to an encryption or integrity protection key, $K_{enc/int}$, for use by the WCD and the base station in encrypting or integrity protecting communication between the WCD and the base station; and means for sending 2610 to the base station, communication that is encrypted or integrity protected using the encryption or integrity protection key converted from the session key, wherein the encryption or integrity protection key $K_{enc/int}$ is at least one of: i) an evolved packet system authentication and key agreement (EPS AKA) key, and ii) a key that has a length different than a length of the session key.

Figure 27:
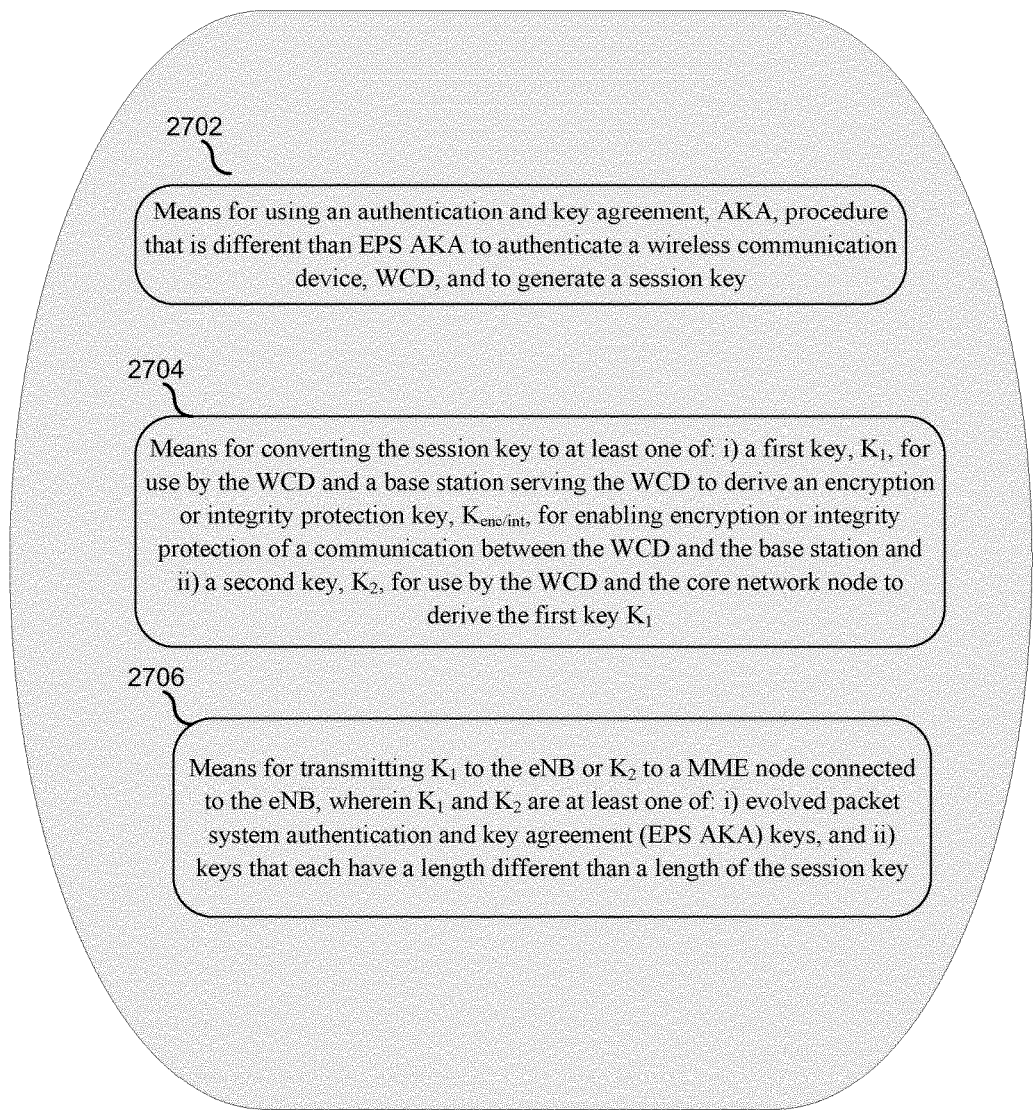
FIG. 27 illustrate example components of a core network node, according to an aspect of the present disclosure.

FIG. 27 illustrates example components of a core network node. These components include means for using 2702 an authentication and key agreement, AKA, procedure that is different than EPS AKA to authenticate a wireless communication device, WCD, and to generate a session key; means for converting 2704 the session key to at least one of: i) a first key, $K_1$, for use by the WCD and a base station serving the WCD to derive an encryption or integrity protection key, $K_{enc/int}$, for enabling encryption or integrity protection of a communication between the WCD and the base station and ii) a second key, $K_2$, for use by the WCD and the core network node to derive the first key $K_1$; and means for transmitting 2706 $K_1$ to the eNB or $K_2$ to a MME node connected to the eNB, wherein $K_1$ and $K_2$ are at least one of: i) evolved packet system authentication and key agreement (EPS AKA) keys, and ii) keys that each have a length different than a length of the session key.

Figure 28:
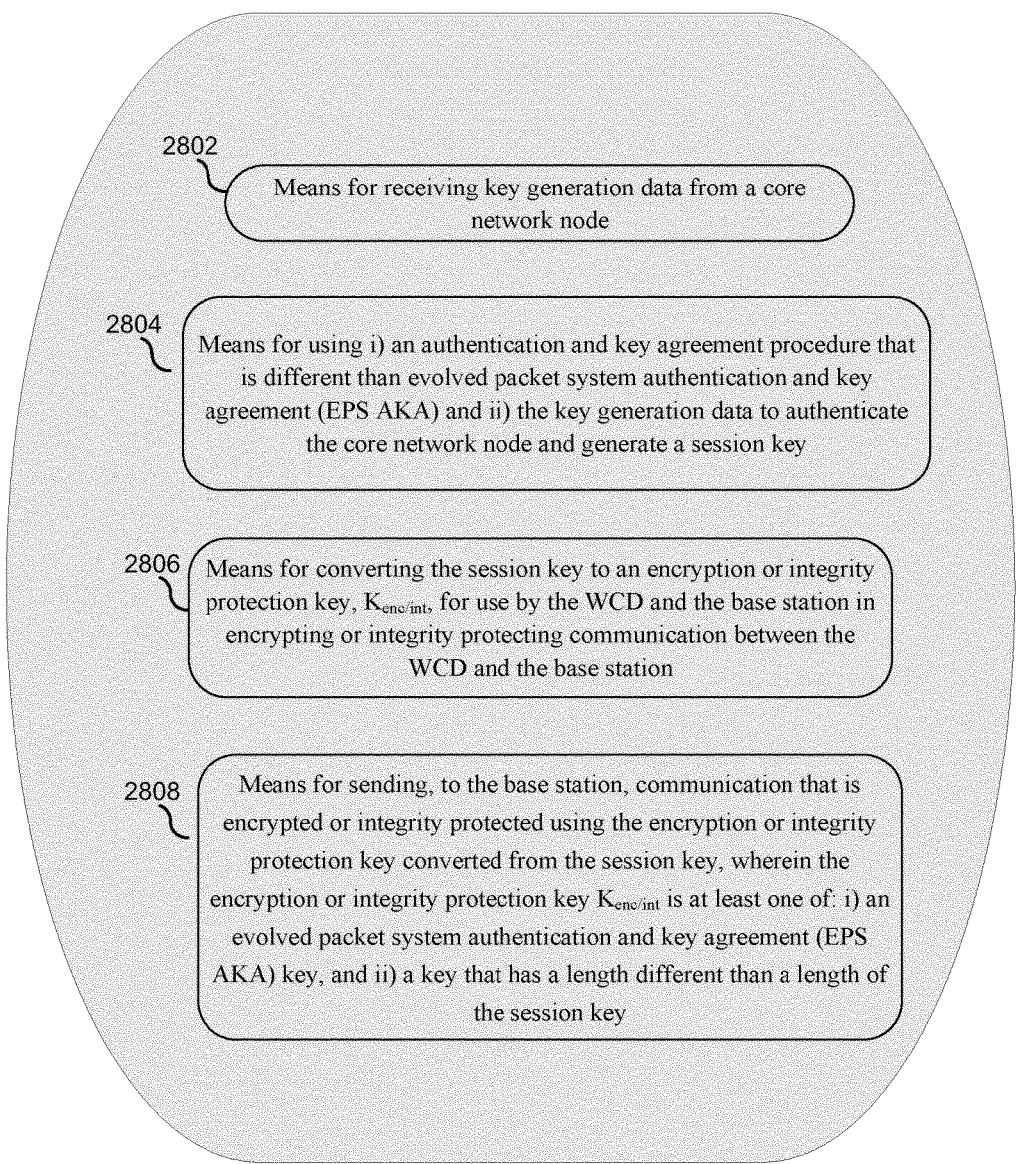
FIG. 28 illustrate example components of WCD, according to an aspect of the present disclosure.

FIG. 28 illustrates example components of a WCD. These components include means for receiving 2802 key generation data from a core network node; means for 2804 using i) an authentication and key agreement procedure that is different than evolved packet system authentication and key agreement (EPS AKA) and ii) the key generation data to authenticate the core network node and generate a session key; means for converting 2806 the session key to an encryption or integrity protection key, $K_{enc/int}$, for use by the WCD and the base station in encrypting or integrity protecting communication between the WCD and the base station; and means for sending 2808, to the base station, communication that is encrypted or integrity protected using the encryption or integrity protection key converted from the session key, wherein the encryption or integrity protection key $K_{enc/int}$ is at least one of: i) an evolved packet system authentication and key agreement (EPS AKA) key, and ii) a key that has a length different than a length of the session key It should be noted that although terminology from 3GPP LTE has been used herein to explain the example embodiments, this should not be seen as limiting the scope of the example embodiments to only the aforementioned system. Other wireless systems, including WCDMA, WiMax, UMB, WiFi (802.11) and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices. Furthermore, it should be appreciated that the term 'user equipment' shall be interpreted as defining any device which may have an internet or network access. Furthermore, it should be appreciated that the term M2M device shall be interpreted as a sub-class of user equipments which engage in infrequent communications.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following summary of example embodiments.

ACRONYM DEFINITIONS

3GPP Third Generation Partnership Project
AKA Authentication and Key Agreement
AS Application Server
AUTN Authentication Token
BSC Base Station Controller
CP Control Plane
E-UTRA Evolved Universal Terrestrial Radio Access
E-UTRAN Evolved Universal Terrestrial Radio Access Network
eNodeB Evolved NodeB EPC Evolved Packet Core
EPS Evolved Packet System
IMSI International Mobile Subscriber Identity
KeNB Intermediate Key at eNB level
LTE Long Term Evolution
MAC Medium Access Control or Message Authentication Code
ME Mobile Equipment
MME Mobility Management Entity
NAS Non-Access Stratum
PCRF Policy Control and Charging Rules Function
PDCP Packet Data Convergence Protocol
PDN Packet Data Network
PGW PDN Gateway
PHY Physical
RAN Radio Access Network
RAND Random Challenge
RES Response
RLC Radio Link Control
RRC Radio Resource Control
SGW Serving Gateway
SIM Subscriber Identity Module
UE User Equipment
UICC Universal Integrated Circuit Card
UP User Plane
USIM Universal Subscriber Identity Module
WCDMA Wideband Code Division Multiple Access

The invention claimed is:

1. A method, in a core network node, for establishing encryption or integrity protection, the method comprising:
   identifying a non-USIM based authentication procedure to be utilized by a wireless communication device, WCD, being served by the core network node;
   obtaining a session key associated with the identified non-USIM based authentication procedure;
   converting the session key associated with the identified non-USIM based authentication procedure to at least one of: i) a first key, $K_1$, for use by the WCD and a base station serving the WCD to derive an encryption or integrity protection key, $K_{enc/int}$, for enabling encryption or integrity protection of a communication between the WCD and the base station and ii) a second key, $K_2$, for use by the WCD and the core network node to derive the first key $K_1$; and
   performing at least one of: i) sending $K_1$ to the base station and ii) sending $K_2$ to another core network node that is configured to derive $K_1$ from $K_2$,
   wherein $K_1$ and $K_2$ each has a length that is at least one of the following: i) equal to a length of an evolved packet system authentication and key agreement (EPS AKA) key, and ii) different from a length of the session key; and
   wherein the core network node is a mobility management entity, MME, node, wherein obtaining the session key comprises receiving the session key from an authentication server, wherein the session key is converted to $K_1$, and wherein $K_1$ is sent from the MME node to the base station serving the WCD.

2. The method of claim 1, wherein $K_1$ is the $K_{eNB}$ key used in the EPS AKA procedure, and wherein converting the session key comprises mapping the session key to a $K_{eNB}$ format.

3. The method of claim 2, wherein the session key is longer than a predefined key length of the $K_{eNB}$ format, and wherein mapping the session key to the $K_{eNB}$ format comprises extracting a portion of the session key to be $K_{eNB}$, wherein the extracted portion has the predefined key length.

4. The method of claim 2, wherein the session key is shorter than the predefined key length of the $K_{eNB}$ format, and wherein mapping the session key to the $K_{eNB}$ format comprises padding the session key with additional bits to be $K_{eNB}$, wherein the padded session key has the predefined key length.

5. The method of claim 1, wherein converting the session key to $K_1$ comprises inputting the session key into a key derivation function, KDF, to output the $K_1$, wherein the KDF is a keyed-hash-message-authentication-code function using a secure hash algorithm, HMAC-SHA.

6. The method of claim 1, further comprising:
   obtaining key generation data that is associated with the identified non-USIM based authentication procedure and that is for use in deriving the session key; and
   sending the key generation data to the WCD.

7. The method of claim 1, wherein identifying the non-USIM based authentication procedure comprises identifying, from among a plurality of network partitions, a network partition to which the WCD is attempting to connect, and determining that the network partition is associated with the non-USIM based authentication procedure.

8. The method of claim 1, wherein identifying the non-USIM based authentication procedure comprises determining that the core network node has received at least one of the following from the WCD: i) a user identifier and password, wherein the user identifier does not have an international mobile subscriber identity, IMSI, format and a password, and ii) a certificate.

9. The method of claim 1, wherein identifying the non-USIM based authentication procedure comprises receiving an indication of authentication type from the WCD, the indication associated with a non-USIM authentication procedure.

10. The method of claim 1, wherein identifying the non-USIM based authentication procedure comprises receiving subscription information associated with the WCD and accessing a database which associates subscription information with authentication procedure.

11. The method of claim 1, wherein identifying the non-USIM based authentication procedure comprises determining, from a device type of the WCD, that the WCD is not a mobile broadband, MBB, device.

12. A method, in a wireless communication device, WCD, for establishing encryption or integrity protection with a base station serving the WCD, the method comprising:
   sending, to a mobility management entity, MME, node, non-USIM based authentication data;
   receiving, from the MME node, key generation data associated with the non-USIM based authentication data;
   generating a non-USIM based session key using the key generation data;
   converting the non-USIM based session key to an encryption or integrity protection key, $K_{enc/int}$, for use by the WCD and the base station in encrypting or integrity protecting any communication between the WCD and the base station; and
   sending, to the base station, a communication that is encrypted or integrity protected using the encryption or integrity protection key converted from the session key, wherein the encryption or integrity protection key $K_{enc/int}$ has a length that is at least one of the following: i) equal to a length of an evolved packet system authentication and key agreement (EPS AKA) key, and ii) different from a length of the session key.

13. The method of claim 12, wherein converting the session key to $K_{enc/int}$ comprises:
- converting the session key to a first key, $K_1$, for use by the WCD and the base station to derive $K_{enc/int}$; and
- converting $K_1$ to $K_{enc/int}$ by inputting $K_1$ and an algorithm distinguisher value into a key derivation function, KDF, wherein the KDF is a hash function, and wherein the algorithm distinguisher value distinguishes between whether the output of the KDF is being used to perform encryption or integrity protection, and distinguishes between whether the output of the KDF is being used for radio resource control, RRC, signaling or for user plane, UP, signaling.

14. The method of claim 13, wherein converting the session key to $K_1$ comprises converting the session key to a second key $K_2$, and converting $K_2$ to $K_1$ by inputting K2 into the KDF.

15. The method of claim 12, wherein the key generation data comprises an identification of a type of authentication procedure between i) the WCD and the MME node or ii) the WCD and an authentication server to which the MME node is connected.

16. The method of claim 12, wherein the non-USIM based authentication data comprises at least one of: i) user identifier and password, wherein the user identifier does not have an IMSI format, and ii) a certificate.

17. The method of claim 12, further comprising sending at least one of: i) a identifier of a network partition the WCD is attempting to access, ii) an identifier of an authentication procedure to be used for authenticating the WCD, iii) a device type of the WCD, and iv) subscription information associated with the WCD.

18. A core network node, for establishing encryption or integrity protection, the core network node comprising:
- a network interface configured to receive communication from a wireless communication device, WCD; and
- a data processing system that is connected to the network interface and that comprises one or more data processing circuits configured to:
  - identify a non-USIM based authentication procedure to be utilized by a wireless communication device, WCD, being served by the core network node;
  - obtain a session key associated with the identified non-USIM based authentication procedure;
  - convert the session key associated with the identified non-USIM based authentication procedure to at least one of: i) a first key, $K_1$, for use by the WCD and a base station serving the WCD to derive an encryption or integrity protection key, $K_{enc/int}$, for enabling encryption or integrity protection of a communication between the WCD and the base station and ii) a second key, $K_2$, for use by the WCD and the core network node to derive the first key $K_1$; and
  - perform at least one of: i) sending $K_1$ to the base station and ii) sending $K_2$ to another core network node that is configured to derive $K_1$ from $K_2$,
- wherein $K_1$ and $K_2$ each has a length that is at least one of the following: i) equal to a length of an evolved packet system authentication and key agreement (EPS AKA) key, and ii) different from a length of the session key; and
- wherein the core network node is a mobility management entity, MME, node, wherein the one or more data processing circuits are configured to obtain the session key by receiving the session key from an authentication server, wherein the session key is converted to $K_1$, and wherein $K_1$ is sent from the MME node to the base station serving the WCD.

19. The core network node of claim 18, wherein $K_1$ is the $K_{eNB}$ key used in the EPS AKA procedure, and wherein the one or more data processing circuits are configured to convert the session key by mapping the session key to a $K_{eNB}$ format.

20. The core network node of claim 19, wherein the session key is longer than a predefined key length of the $K_{eNB}$ format, and wherein the one or more data processing circuits are configured map the session key to the $K_{eNB}$ format by extracting a portion of the session key to be $K_{eNB}$, wherein the extracted portion has the predefined key length.

21. The core network node of claim 19, wherein the session key is shorter than the predefined key length of the $K_{eNB}$ format, and wherein the one or more data processing circuits are configured to map the session key to the $K_{eNB}$ format by padding the session key with additional bits to be $K_{eNB}$, wherein the padded session key has the predefined key length.

22. The core network node of claim 19, wherein the one or more data processing circuits are configured convert the session key to $K_1$ by inputting the session key into a key derivation function, KDF, to output the $K_1$, wherein the KDF is a keyed-hash-message-authentication-code function using a secure hash algorithm, HMAC-SHA.

23. The core network node of claim 18, wherein the one or more data processing circuits are further configured to:
- obtain key generation data that is associated with the identified non-USIM based authentication procedure and that is for use in deriving the session key; and
- send the key generation data to the WCD.

24. The core network node of claim 18, wherein the one or more data processing circuits are configured to identify the non-USIM based authentication procedure by identifying, from among a plurality of network partitions, a network partition to which the WCD is attempting to connect, and determining that the network partition is associated with the non-USIM based authentication procedure.

25. The core network node of claim 18, wherein the one or more data processing circuits are configured to identify the non-USIM based authentication procedure comprises by determining that the core network node has received at least one of the following from the WCD: i) a user identifier and password, wherein the user identifier does not have an international mobile subscriber identity, IMSI, format and a password, and ii) a certificate.

26. The core network node of claim 18, wherein the one or more data processing circuits are configured to identify the non-USIM based authentication procedure by receiving an indication of authentication type from the WCD, the indication associated with a non-USIM authentication procedure.

27. The core network node of claim 18, wherein the one or more data processing circuits are configured to identify the non-USIM based authentication procedure by receiving subscription information associated with the WCD and accessing a database which associates subscription information with authentication procedure.

28. The core network node of claim 18, wherein the one or more data processing circuits are configured to identify the non-USIM based authentication procedure by determining, from a device type of the WCD, that the WCD is not a mobile broadband, MBB, device.

29. A wireless communication device, WCD, for establishing encryption or integrity protection with a base station serving the WCD, the WCD comprising:
- a transceiver system for receiving communication from a mobility management entity, MME, node; and
- a data processing system connected to the transceiver system and having one or more data processing circuits configured to:
  - send, to a mobility management entity, MME, node, non-USIM based authentication data;
  - receive, from the MME node, key generation data associated with the non-USIM based authentication data;
  - generate a non-USIM based session key using the key generation data;
  - convert the non-USIM based session key to an encryption or integrity protection key, $K_{enc/int}$, for use by the WCD and the base station in encrypting or integrity protecting communication between the WCD and the base station; and
  - send, to the base station, communication that is encrypted or integrity protected using the encryption or integrity protection key converted from the session key,
- wherein the encryption or integrity protection key $K_{enc/int}$ has a length that is at least one of the following: i) equal to a length of an evolved packet system authentication and key agreement (EPS AKA) key, and ii) different from a length of the session key.

30. The WCD of claim 29, wherein the one or more data processing circuits are configured to convert the session key to $K_{enc/int}$ by:
- converting the session key to a first key, $K_1$, for use by the WCD and the base station to derive $K_{enc/int}$; and
- converting $K_1$ to $K_{enc/int}$ by inputting $K_1$ and an algorithm distinguisher value into a key derivation function, KDF, wherein the KDF is a hash function, and wherein the algorithm distinguisher value distinguishes between whether the output of the KDF is being used to perform encryption or integrity protection, and distinguishes between whether the output of the KDF is being used for radio resource control, RRC, signaling or for user plane, UP, signaling.

31. The WCD of claim 30, wherein the one or more data processing circuits are configured to convert the session key to $K_1$ by converting the session key to a second key $K_2$, and converting $K_2$ to $K_1$ by inputting $K2$ into the KDF.

32. The WCD of claim 29, wherein the key generation data comprises an identification of a type of authentication procedure between i) the WCD and the MME node or ii) the WCD and an authentication server to which the MME node is connected.

33. The WCD of claim 29, wherein the non-USIM based authentication data comprises at least one of: i) user identifier and password, wherein the user identifier does not have an IMSI format, and ii) a certificate.

34. A method, in a core network node, for establishing encryption or integrity protection, the method comprising:
- identifying a non-USIM based authentication procedure to be utilized by a wireless communication device, WCD, being served by the core network node;
- obtaining a session key associated with the identified non-USIM based authentication procedure;
- converting the session key associated with the identified non-USIM based authentication procedure to at least one of: i) a first key, $K_1$, for use by the WCD and a base station serving the WCD to derive an encryption or integrity protection key, $K_{enc/int}$, for enabling encryption or integrity protection of a communication between the WCD and the base station and ii) a second key, $K_2$, for use by the WCD and the core network node to derive the first key $K_1$; and
- performing at least one of: i) sending $K_1$ to the base station and ii) sending $K_2$ to another core network node that is configured to derive $K_1$ from $K_2$,
- wherein $K_1$ and $K_2$ each has a length that is at least one of the following: i) equal to a length of an evolved packet system authentication and key agreement (EPS AKA) key, and ii) different from a length of the session key; and
- wherein the core network node is an authentication server, wherein the session key is converted to $K_2$, and wherein $K_2$ is sent to a MME node.

35. The method of claim 34, further comprising:
- obtaining key generation data that is associated with the identified non-USIM based authentication procedure and that is for use in deriving the session key; and
- sending the key generation data to the WCD.

36. The method of claim 34, wherein identifying the non-USIM based authentication procedure comprises identifying, from among a plurality of network partitions, a network partition to which the WCD is attempting to connect, and determining that the network partition is associated with the non-USIM based authentication procedure.

37. The method of claim 34, wherein identifying the non-USIM based authentication procedure comprises determining that the core network node has received at least one of the following from the WCD: i) a user identifier and password, wherein the user identifier does not have an international mobile subscriber identity, IMSI, format and a password, and ii) a certificate.

38. The method of claim 34, wherein identifying the non-USIM based authentication procedure comprises receiving an indication of authentication type from the WCD, the indication associated with a non-USIM authentication procedure.

39. The method of claim 34, wherein identifying the non-USIM based authentication procedure comprises receiving subscription information associated with the WCD and accessing a database which associates subscription information with authentication procedure.

40. The method of claim 34, wherein identifying the non-USIM based authentication procedure comprises determining, from a device type of the WCD, that the WCD is not a mobile broadband, MBB, device.

41. A core network node, for establishing encryption or integrity protection, the core network node comprising:
- a network interface configured to receive communication from a wireless communication device, WCD; and
- a data processing system that is connected to the network interface and that comprises one or more data processing circuits configured to:
  - identify a non-USIM based authentication procedure to be utilized by a wireless communication device, WCD, being served by the core network node;
  - obtain a session key associated with the identified non-USIM based authentication procedure;
  - convert the session key associated with the identified non-USIM based authentication procedure to at least one of: i) a first key, $K_1$, for use by the WCD and a base station serving the WCD to derive an encryption or integrity protection key, $K_{enc/int}$, for enabling encryption or integrity protection of a communication between the WCD and the base station and ii) a second key, $K_2$, for use by the WCD and the core network node to derive the first key $K_1$; and perform at least one of: i) sending $K_1$ to the base station and ii) sending $K_2$ to another core network node that is configured to derive $K_1$ from $K_2$, wherein $K_1$ and $K_2$ each has a length that is at least one of the following: i) equal to a length of an evolved packet system authentication and key agreement (EPS AKA) key, and ii) different from a length of the session key; and wherein the core network node is an authentication server, wherein the session key is converted to $K_2$, and wherein $K_2$ is sent to a MME node.

42. The core network node of claim 41, wherein the one or more data processing circuits are further configured to:
obtain key generation data that is associated with the identified non-USIM based authentication procedure and that is for use in deriving the session key; and
send the key generation data to the WCD.

43. The core network node of claim 41, wherein the one or more data processing circuits are configured to identify the non-USIM based authentication procedure by identifying, from among a plurality of network partitions, a network partition to which the WCD is attempting to connect, and determining that the network partition is associated with the non-USIM based authentication procedure.

44. The core network node of claim 41, wherein the one or more data processing circuits are configured to identify the non-USIM based authentication procedure comprises by determining that the core network node has received at least one of the following from the WCD: i) a user identifier and password, wherein the user identifier does not have an international mobile subscriber identity, IMSI, format and a password, and ii) a certificate.

45. The core network node of claim 41, wherein the one or more data processing circuits are configured to identify the non-USIM based authentication procedure by receiving an indication of authentication type from the WCD, the indication associated with a non-USIM authentication procedure.

46. The core network node of claim 41, wherein the one or more data processing circuits are configured to identify the non-USIM based authentication procedure by receiving subscription information associated with the WCD and accessing a database which associates subscription information with authentication procedure.

47. The core network node of claim 41, wherein the one or more data processing circuits are configured to identify the non-USIM based authentication procedure by determining, from a device type of the WCD, that the WCD is not a mobile broadband, MBB, device.

48. The method of claim 34, wherein $K_2$ is an access security management entity key, $K_{ASME}$, used in a EPS AKA procedure, and wherein converting the session key comprises mapping the session key to a $K_{ASME}$ format.

49. The method of claim 48, wherein the session key is longer than a predefined key length of the $K_{ASME}$ format, and wherein mapping the session key to the $K_{ASME}$ format comprises extracting a portion of the session key to be $K_{ASME}$, wherein the extracted portion has the predefined key length.

50. The method of claim 48, wherein the session key is shorter than the predefined key length of the $K_{ASME}$ format, and wherein mapping the session key to the $K_{ASME}$ format comprises padding the session key with additional bits to be $K_{ASME}$, wherein the padded session key has the predefined key length.

51. The method of claim 48, wherein converting the session key to $K_{ASME}$ comprises inputting the session key into a key derivation function, KDF, to output the $K_{ASME}$, the KDF is a keyed-hash-message-authentication-code function using a secure hash algorithm, HMAC-SHA.

52. The core network node of claim 41, wherein $K_2$ is an access security management entity key, $K_{ASME}$, used in a EPS AKA procedure, and wherein the one or more data processing circuits are configured to map the session key by mapping the session key to a $K_{ASME}$ format.

53. The core network node of claim 52, wherein the session key is longer than a predefined key length of the $K_{ASME}$ format, and wherein the one or more data processing circuits are configured to map the session key to the $K_{ASME}$ format by extracting a portion of the session key to be $K_{ASME}$, wherein the extracted portion has the predefined key length.

54. The core network node of claim 52, wherein the session key is shorter than the predefined key length of the $K_{ASME}$ format, and wherein the one or more data processing circuits are configured to map the session key to the $K_{ASME}$ format by padding the session key with additional bits to be $K_{ASME}$, wherein the padded session key has the predefined key length.

55. The core network node of claim 52, wherein the one or more data processing circuits are configured to map the session key to $K_{ASME}$ by inputting the session key into a key derivation function, KDF, to output the $K_{ASME}$, wherein the KDF is a keyed-hash-message-authentication-code function using a secure hash algorithm, HMAC-SHA.

\* \* \* \* \*